US011190308B2

(12) United States Patent
Namboodiri et al.

(10) Patent No.: US 11,190,308 B2
(45) Date of Patent: Nov. 30, 2021

(54) ACHIEVING SYNCHRONIZATION IN AN ORTHOGONAL TIME FREQUENCY SPACE SIGNAL RECEIVER

(71) Applicant: Cohere Technologies, Inc., Santa Clara, CA (US)

(72) Inventors: Vamadevan Namboodiri, Santa Clara, CA (US); Karl Sanders, Santa Clara, CA (US); Yaron Rozenbaum, Santa Clara, CA (US); James Delfeld, Santa Clara, CA (US)

(73) Assignee: Cohere Technologies, Inc., Santa Clara, CA (US)

(*) Notice: Subject to any disclaimer, the term of this patent is extended or adjusted under 35 U.S.C. 154(b) by 0 days.

(21) Appl. No.: 16/645,585

(22) PCT Filed: Sep. 14, 2018

(86) PCT No.: PCT/US2018/051199
§ 371 (c)(1),
(2) Date: Mar. 9, 2020

(87) PCT Pub. No.: WO2019/055861
PCT Pub. Date: Mar. 21, 2019

(65) Prior Publication Data
US 2020/0287672 A1 Sep. 10, 2020

Related U.S. Application Data

(60) Provisional application No. 62/559,398, filed on Sep. 15, 2017.

(51) Int. Cl.
*H04L 5/00* (2006.01)
*H04L 27/156* (2006.01)
(Continued)

(52) U.S. Cl.
CPC ........ *H04L 5/0023* (2013.01); *H04L 27/1566* (2013.01); *H04L 27/2607* (2013.01);
(Continued)

(58) Field of Classification Search
CPC ............... H04L 5/0023; H04L 27/1566; H04L 27/2607; H04L 27/2623; H04L 27/2663;
(Continued)

(56) References Cited

U.S. PATENT DOCUMENTS 4,754,493 A 6/1988 Coates
5,083,135 A 1/1992 Nagy et al.
(Continued)

FOREIGN PATENT DOCUMENTS

CN 1235720 A 11/1999
CN 101682316 A 3/2010
(Continued)

OTHER PUBLICATIONS

"Orthogonal Time Frequency Space Modulation"; Hadani et al.; 2017 IEEE Wireless Communications and Networking Conference (WCNC); Mar. 22, 2017 (Year: 2017).*
(Continued)

Primary Examiner — Benjamin H Elliott, IV
(74) Attorney, Agent, or Firm — Perkins Coie LLP

(57) ABSTRACT

Methods, systems and device for achieving synchronization in an orthogonal time frequency space (OTFS) signal receiver are described. An exemplary signal reception technique includes receiving an OTFS modulated wireless signal comprising pilot signal transmissions interspersed with data transmissions, calculating autocorrelation of the wireless signal using the wireless signal and a delayed version of the wireless signal that is delayed by a pre-determined delay, thereby generating an autocorrelation output, processing the autocorrelation filter through a moving average filter to
(Continued)

produce a fine timing signal. Another exemplary signal reception technique includes receiving an OTFS modulated wireless signal comprising pilot signal transmissions interspersed with data transmissions, performing an initial automatic gain correction of the received OTFS wireless signal by peak detection and using clipping information, performing coarse automatic gain correction on results of a received and initial automatic gain control (AGC)-corrected signal.

15 Claims, 38 Drawing Sheets

(51) Int. Cl.
*H04L 27/26* (2006.01)
*H04W 52/52* (2009.01)
(52) U.S. Cl.
CPC ...... *H04L 27/2623* (2013.01); *H04L 27/2663* (2013.01); *H04W 52/52* (2013.01)
(58) Field of Classification Search
CPC ... H04L 5/0048; H04L 27/2639; H04L 23/02; H04L 27/26532; H04W 52/52
See application file for complete search history.

(56) References Cited

U.S. PATENT DOCUMENTS

| | | | |
|---|---|---|---|
| 5,182,642 A | 1/1993 | Gersdorff et al. | |
| 5,623,511 A | 4/1997 | Bar-David et al. | |
| 5,831,977 A | 11/1998 | Dent | |
| 5,872,542 A | 2/1999 | Simons et al. | |
| 5,956,624 A | 9/1999 | Hunsinger et al. | |
| 6,212,246 B1 | 4/2001 | Hendrickson | |
| 6,289,063 B1 | 9/2001 | Duxbury | |
| 6,356,555 B1 | 3/2002 | Rakib et al. | |
| 6,388,621 B1 | 5/2002 | Lynch | |
| 6,426,983 B1 | 7/2002 | Rakib et al. | |
| 6,608,864 B1 | 8/2003 | Strait | |
| 6,631,168 B2 | 10/2003 | Izumi | |
| 6,704,366 B1 | 3/2004 | Combes et al. | |
| 6,956,814 B1 | 10/2005 | Campanella | |
| 7,010,048 B1 | 3/2006 | Shattil | |
| 7,058,151 B1 * | 6/2006 | Kim ................... H04L 27/2613 370/207 |
| 7,327,812 B2 | 2/2008 | Auer | |
| 7,392,018 B1 | 6/2008 | Ebert et al. | |
| 7,689,049 B2 | 3/2010 | Monro | |
| 7,773,685 B2 | 8/2010 | Tirkkonen et al. | |
| 7,864,877 B2 | 1/2011 | Hottinen | |
| 8,229,017 B1 | 7/2012 | Lee et al. | |
| 8,259,845 B2 | 9/2012 | Dent | |
| 8,401,131 B2 | 3/2013 | Fety et al. | |
| 8,547,988 B2 | 10/2013 | Hadani et al. | |
| 8,619,892 B2 | 12/2013 | Vetter et al. | |
| 8,717,210 B2 | 5/2014 | Eldar et al. | |
| 8,879,378 B2 | 11/2014 | Rakib et al. | |
| 8,892,048 B1 | 11/2014 | Turner | |
| 8,976,851 B2 | 3/2015 | Hadani et al. | |
| 9,031,141 B2 | 5/2015 | Hadani et al. | |
| 9,071,285 B2 | 6/2015 | Hadani et al. | |
| 9,071,286 B2 | 6/2015 | Hadani et al. | |
| 9,083,483 B1 | 7/2015 | Rakib et al. | |
| 9,083,595 B2 | 7/2015 | Rakib et al. | |
| 9,130,638 B2 | 9/2015 | Hadani et al. | |
| 9,282,528 B2 | 3/2016 | Hashimoto | |
| 9,294,315 B2 | 3/2016 | Hadani et al. | |
| 9,444,514 B2 | 9/2016 | Hadani et al. | |
| 9,548,840 B2 | 1/2017 | Hadani et al. | |
| 9,553,984 B2 | 1/2017 | Krause et al. | |
| 9,590,779 B2 | 3/2017 | Hadani et al. | |
| 9,634,719 B2 | 4/2017 | Rakib et al. | |
| 9,660,851 B2 | 5/2017 | Hadani et al. | |
| 9,661,604 B1 * | 5/2017 | O'Shea ..................... G01S 5/02 |
| 9,668,148 B2 | 5/2017 | Hadani et al. | |
| 9,712,354 B2 | 7/2017 | Hadani et al. | |
| 9,729,281 B2 | 8/2017 | Hadani et al. | |
| 2001/0031022 A1 | 10/2001 | Petrus et al. | |
| 2001/0033614 A1 | 10/2001 | Hudson | |
| 2001/0046205 A1 | 11/2001 | Easton et al. | |
| 2002/0001308 A1 | 1/2002 | Heuer | |
| 2002/0034191 A1 | 3/2002 | Shattil | |
| 2002/0181388 A1 | 12/2002 | Jain et al. | |
| 2002/0181390 A1 | 12/2002 | Mody et al. | |
| 2002/0181607 A1 | 12/2002 | Izumi | |
| 2003/0073464 A1 | 4/2003 | Giannakis et al. | |
| 2003/0185295 A1 | 10/2003 | Yousef | |
| 2003/0235147 A1 | 12/2003 | Walton et al. | |
| 2004/0044715 A1 | 3/2004 | Aldroubi et al. | |
| 2004/0174812 A1 | 9/2004 | Murakami et al. | |
| 2004/0189581 A1 | 9/2004 | Sako et al. | |
| 2004/0190438 A1 * | 9/2004 | Maltsev ............ H04L 27/2675 370/206 |
| 2004/0218523 A1 | 11/2004 | Varshney et al. | |
| 2005/0157778 A1 | 7/2005 | Trachewsky et al. | |
| 2005/0157820 A1 | 7/2005 | Wongwirawat et al. | |
| 2005/0180517 A1 | 8/2005 | Abe | |
| 2005/0207334 A1 | 9/2005 | Hadad | |
| 2005/0251844 A1 | 11/2005 | Martone et al. | |
| 2006/0008021 A1 | 1/2006 | Bonnet | |
| 2006/0039270 A1 | 2/2006 | Strohmer et al. | |
| 2007/0014272 A1 | 1/2007 | Palanki et al. | |
| 2007/0038691 A1 | 2/2007 | Candes et al. | |
| 2007/0078661 A1 | 4/2007 | Sriram et al. | |
| 2007/0104283 A1 | 5/2007 | Han et al. | |
| 2007/0110131 A1 | 5/2007 | Guess et al. | |
| 2007/0133386 A1 * | 6/2007 | Kim ................... H04L 27/2663 370/203 |
| 2007/0211952 A1 | 9/2007 | Faber et al. | |
| 2007/0230403 A1 * | 10/2007 | Douglas ............... H04W 24/00 370/334 |
| 2007/0237181 A1 | 10/2007 | Cho et al. | |
| 2007/0253465 A1 * | 11/2007 | Muharemovic ..... H04J 13/0062 375/130 |
| 2007/0253504 A1 | 11/2007 | Hasegawa | |
| 2008/0043857 A1 | 2/2008 | Dias et al. | |
| 2008/0117999 A1 | 5/2008 | Kadous et al. | |
| 2008/0186843 A1 | 8/2008 | Ma et al. | |
| 2008/0187062 A1 | 8/2008 | Pan et al. | |
| 2008/0232504 A1 | 9/2008 | Ma et al. | |
| 2008/0310383 A1 | 12/2008 | Kowalski | |
| 2009/0080403 A1 | 3/2009 | Hamdi | |
| 2009/0092259 A1 | 4/2009 | Jot et al. | |
| 2009/0103593 A1 | 4/2009 | Bergamo | |
| 2009/0122854 A1 | 5/2009 | Zhu et al. | |
| 2009/0161804 A1 | 6/2009 | Chrabieh et al. | |
| 2009/0204627 A1 | 8/2009 | Hadani | |
| 2009/0213943 A1 | 8/2009 | Gu et al. | |
| 2009/0222226 A1 | 9/2009 | Baraniuk et al. | |
| 2009/0225741 A1 * | 9/2009 | Wang .................. H04L 27/2605 370/345 |
| 2009/0225822 A1 * | 9/2009 | Tupala ................ H04L 27/2675 375/226 |
| 2009/0303961 A1 | 12/2009 | Popovic et al. | |
| 2010/0001901 A1 | 1/2010 | Baraniuk et al. | |
| 2010/0008432 A1 | 1/2010 | Kim et al. | |
| 2010/0027608 A1 | 2/2010 | Priotti | |
| 2010/0111138 A1 | 5/2010 | Hosur et al. | |
| 2010/0142476 A1 | 6/2010 | Jiang et al. | |
| 2010/0187914 A1 | 7/2010 | Rada et al. | |
| 2010/0238787 A1 | 9/2010 | Guey | |
| 2010/0277308 A1 | 11/2010 | Potkonjak | |
| 2010/0303136 A1 | 12/2010 | Ashikhmin et al. | |
| 2010/0322349 A1 | 12/2010 | Lee et al. | |
| 2011/0007789 A1 * | 1/2011 | Garmany .......... H04L 25/03159 375/224 |
| 2011/0110532 A1 | 5/2011 | Svendsen | |
| 2011/0116489 A1 | 5/2011 | Grandhi | |
| 2011/0116516 A1 | 5/2011 | Hwang et al. | |
| 2011/0126071 A1 | 5/2011 | Han et al. | |
| 2011/0131463 A1 | 6/2011 | Gunnam | |
| 2011/0216808 A1 | 9/2011 | Tong et al. | |
| 2011/0286502 A1 | 11/2011 | Adachi et al. | |

(56) References Cited

U.S. PATENT DOCUMENTS

| | | |
|---|---|---|
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Riu et al. |
| 2012/0020439 A1* | 1/2012 | Belveze ............ H04L 25/0232 375/343 |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Mm et al. |
| 2012/0201322 A1* | 8/2012 | Rakib ................ H04L 27/2613 375/285 |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0003567 A1* | 1/2015 | Stadelmeier ........ H04L 5/0048 375/308 |
| 2015/0117395 A1* | 4/2015 | Hadani ................ H04L 5/0048 370/330 |
| 2015/0326273 A1* | 11/2015 | Rakib ................ H04B 7/0626 375/131 |
| 2015/0327085 A1* | 11/2015 | Hadani ................ H04L 5/0007 370/252 |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0149741 A1* | 5/2016 | Fujikura ................ H04B 1/18 375/343 |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0277230 A1* | 9/2016 | Zhu ................ H04L 27/2662 |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib et al. |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |
| 2019/0081836 A1* | 3/2019 | Hadani ................ H04L 5/0048 |
| 2020/0287672 A1* | 9/2020 | Namboodiri ........ H04L 5/0023 |

FOREIGN PATENT DOCUMENTS

| | | |
|---|---|---|
| CN | 101939935 A | 1/2011 |
| EP | 1432168 A1 | 6/2004 |
| EP | 2806610 A1 | 11/2014 |
| JP | 2011127910 A | 6/2011 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011478 | 1/2017 |

OTHER PUBLICATIONS

"Orthogonal Time Frequency Space (OTFS) modulation for millimeter-wave communications systems"; Hadani et al.; 2017 IEEE MTT-S International Microwave Symposium (IMS); Jun. 9, 2017 (Year: 2017).*

Office Action for U.S. Appl. No. 13/117,119, dated Aug. 5, 2013, 5 pages.

Notice of Allowance for U.S. Appl. No. 13/117,119, dated Feb. 28, 2014, 13 pages.

Banelli, P. et al., "Modulation Formats and Waveforms for 5G Networks: Who Will Be the Heir of OFDM?," IEEE Signal Processing Magazine, vol. 81, pp. 80-93, Nov. 2014.

El Hattachi, R. et al., "NGMN 5G Initiative White Paper," NGMN Alliance, Feb. 17, 2015. [Online], Available: https://www.ngmn.org/uploads/media/NGMN_5G_White_Paper_V1_0.pdf, 125 pages.

Rusek, F. et al., "Scaling Up MIMO, Opportunities and Challenges with Very Large Arrays," IEEE Signal Processing Magazine, pp. 40-60 (2013).

Vodafone, "Cellular Internet of Things: Architectural Aspects," RP-150869, 3GPP RAN#68, Malmo, Sweden (Jun. 9, 2015), 19 pages.

Supplementary European Search Report for European Application No. 11787483.4, dated Sep. 9, 2014, 6 pages.

International Search Report and Written Opinion for International Application No. PCT/US2011/038302, dated Nov. 15, 2011, 8 pages.

International Preliminary Report on Patentability for International Application No. PCT/US2011/038302, dated Dec. 4, 2012, 7 pages.

Office Action for U.S. Appl. No. 13/117,124, dated Feb. 22, 2013, 7 pages.

Notice of Allowance for U.S. Appl. No. 13/117,124, dated Aug. 8, 2013, 10 pages.

Office Action for U.S. Appl. No. 14/605,957, dated Jun. 22, 2017, 6 pages.

Supplementary European Search Report for European Application No. 13809004.8, dated Apr. 14, 2016, 8 pages.

Communication Pursuant to Article 94(3) EPC for European Application No. 13809004.8, dated Feb. 17, 2017, 5 pages.

Notice of Allowance for U.S. Appl. No. 13/927,087, dated Feb. 25, 2015, 9 pages.

Office Action for U.S. Appl. No. 13/927,087, dated Nov. 12, 2014, 14 pages.

Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).

International Search Report and Written Opinion for International Application No. PCT/US2013/047723, dated Oct. 29, 2013, 17 pages.

(56) References Cited

OTHER PUBLICATIONS

International Preliminary Report on Patentability for International Application No. PCT/US2013/047723, dated Dec. 31, 2014, 15 pages.
Notice of Allowance for U.S. Appl. No. 13/927,088, dated Feb. 18, 2015, 7 pages.
Office Action for U.S. Appl. No. 13/927,088, dated Nov. 28, 2014, 13 pages.
Notice of Allowance for U.S. Appl. No. 13/927,086, dated Dec. 26, 2014, 8 pages.
Supplemental Notice of Allowability for U.S. Appl. No. 13/927,086, dated Mar. 19, 2015, 4 pages.
Office Action for U.S. Appl. No. 13/927,086, dated Oct. 14, 2014, 10 pages.
Office Action for U.S. Appl. No. 13/927,089, dated Dec. 24, 2014, 13 pages.
Office Action for U.S. Appl. No. 13/927,089, dated Aug. 14, 2015, 7 pages.
Supplemental Notice of Allowability for U.S. Appl. No. 13/927,091, dated Jun. 11, 2015, 4 pages.
Notice of Allowance for U.S. Appl. No. 13/927,091, dated Apr. 24, 2015, 8 pages.
Office Action for U.S. Appl. No. 13/927,091, dated Jan. 27, 2015, 15 pages.
Office Action for U.S. Appl. No. 13/927,092, dated Oct. 8, 2014, 5 pages.
Notice of Allowance for U.S. Appl. No. 13/927,092, dated Oct. 24, 2014, 7 pages.
Office Action for U.S. Appl. No. 13/927,095, dated Apr. 30, 2015, 11 pages.
Office Action for U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.
Examination Report No. 1 for Australian Application No. 2013239970, dated Dec. 8, 2015, 3 pages.
"AT&T Annual Report 2014," Opening Our Network [Online], Retrieved from the Internet Sep. 22, 2016. <URL: http://www.att.com/Investor/ATT_Annual/2014/att_introduces_new_concepts_for_telecom_network.html>, 5 pages.
Catt, "UL ACK/NACK transmission methods for LTE-A," 3GPP TSG RAN WG1 Meeting #60bis, R1-102453, Beijing, China, Apr. 12-16, 2010, 8 pages.
Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pages.

Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.
International Search Report and Written Opinion for International Application No. PCT/US2017/025797, dated Jun. 21, 2017, 6 pages.
International Search Report and Written Opinion for International Application No. PCT/US2016/030259, dated Aug. 4, 2016, 13 pages.
Office Action for U.S. Appl. No. 15/152,464, dated Apr. 6, 2017, 10 pages.
Examination Report No. 1 for Australian Application No. 2013280487, dated May 2, 2016, 3 pages.
International Search Report and Written Opinion for International Application No. PCT/US2016/031928, dated Oct. 7, 2016, 10 pages.
Office Action for U.S. Appl. No. 15/188,946, dated May 8, 2017, 14 pages.
International Search Report and Written Opinion for International Application No. PCT/US2016/038584, dated Sep. 26, 2016, 8 pages.
Office Action for U.S. Appl. No. 15/187,668, dated Feb. 16, 2017, 6 pages.
International Search Report and Written Opinion for International Application No. PCT/US2016/031909, dated Aug. 11, 2016, 13 pages.
Office Action for U.S. Appl. No. 15/194,494, dated May 5, 2017, 16 pages.
International Search Report and Written Opinion for International Application No. PCT/US2016/039662, dated Nov. 29, 2016, 14 pages.
Office Action for U.S. Appl. No. 15/436,653, dated Jun. 2, 2017, 10 pages.
Office Action for U.S. Appl. No. 15/208,545, dated Aug. 21, 2017, 15 pages.
International Search Report and Written Opinion for International Application No. PCT/US2016/041940, dated Oct. 20, 2016, 8 pages.
Supplementary European Search Report for European Application No. 13768150.8, dated Oct. 30, 2015, 7 pages.
International Search Report and Written Opinion for International Application No. PCT/US2013/033652, dated Jun. 12, 2013, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.
Partial Search Report for EP Appl. No. 18857085.7, dated Apr. 29, 2021, 14 pages.
Li et al.: "A Simple Two-stage Equalizer With Simplified Orthogonal Time Frequency Space Modulation Over Rapidly Time-varying Channels", Cornell University Library, Sep. 8, 2017, 4 Pages.
Keller et al.: "Orthogonal Frequency Division Multiplex Synchronization Techniques for Frequency-Selective Fading Channels", IEEE Journal on Selected Areas in Communications, vol. 19, No. 6, Jun. 2001, pp. 999-1008, XP001103020.
Extended Search Report for EP Appl. No. 18857085.7, dated Aug. 2, 2021, 12 pages.

\* cited by examiner

ACHIEVING SYNCHRONIZATION IN AN ORTHOGONAL TIME FREQUENCY SPACE SIGNAL RECEIVER

CROSS-REFERENCE TO RELATED APPLICATION

This patent document is a 371 National Phase Application of PCT Application No. PCT/US2018/051199 entitled "ACHIEVING SYNCHRONIZATION IN AN ORTHOGONAL TIME FREQUENCY SPACE SIGNAL RECEIVER" filed on Sep. 14, 2018 which claims the benefit of priority U.S. Provisional Patent Application No. 62/559,398, filed on Sep. 15, 2017. The entire content of the before-mentioned patent application is incorporated by reference as part of the disclosure of this document.

TECHNICAL FIELD

The present document relates to wireless communication, and more particularly, synchronization at a receiver.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

This document discloses techniques for receiver-side processing in which signals modulated using orthogonal time frequency space (OTFS) modulations are received and processed to extract modulated data.

In one example aspect, a signal reception method is disclosed. The method includes receiving an OTFS modulated wireless signal comprising pilot signal transmissions interspersed with data transmissions, calculating autocorrelation of the wireless signal using the wireless signal and a delayed version of the wireless signal that is delayed by a pre-determined delay, thereby generating an autocorrelation output, processing the autocorrelation filter through a moving average filter to produce a fine timing signal, and performing synchronization with the wireless signal using the fine timing signal.

In another aspect a signal reception method is disclosed. The method includes receiving an OTFS modulated wireless signal comprising pilot signal transmissions interspersed with data transmissions, performing an initial automatic gain correction of the received OTFS wireless signal by peak detection and using clipping information, performing coarse automatic gain correction on results of a received and initial automatic gain control (AGC)-corrected signal.

In another example aspect, a wireless communication apparatus that implements the above-described method is disclosed.

In yet another example aspect, the method may be embodied as processor-executable code and may be stored on a computer-readable program medium.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document to improve readability of the description and do not, in any way, limit the discussion to the respective sections only.

In recent years, to meet the increased demand of ever higher data throughput many new techniques have been introduced in wireless communications. For example, the amount of bandwidth, measured as a total number or as a number of bits per Hertz per second number, has grown steadily over years in prevalent communication standards such as the Long Term Evolution (LTE). This trend is expected to grow even more due to the explosion of smartphones and multimedia streaming services.

Recently, a modulation scheme called orthogonal time frequency space (OTFS), has been proposed for wireless data transmissions. An OTFS transmitter may generate transmission signals by modulating the incoming bit stream into OTFS frames. An OTFS receiver may be used to receive OTFS modulated signals and recover data bits from the signal.

The OTFS receiver should reliably and accurately (a) estimate the receiver gain required and apply it through RF and base band (both analog and digital) stages such that the digital sections of the OTFS receiver obtain samples with maximum fidelity (this is sometimes called automatic gain control or AGC) and (b) acquire synchronization in the presence of channels with a multitude of reflectors that has a range of delay and Doppler characteristics.

This document provides the requirements for AGC and synchronization and outlines a technical approach to meet these requirements. In general terms, both the AGC and synchronization is achieved by multiple stages of intertwined processing, including the computation of auto-correlation followed by moving average filtering to perform initial, coarse and fine AGC and coarse synchronization and fine synchronization. These, and other aspects, are described in the present document.

Section headings are used only to facilitate readability and are not intended to limit the embodiments and technology described in each section only to that section.

Figure 1:
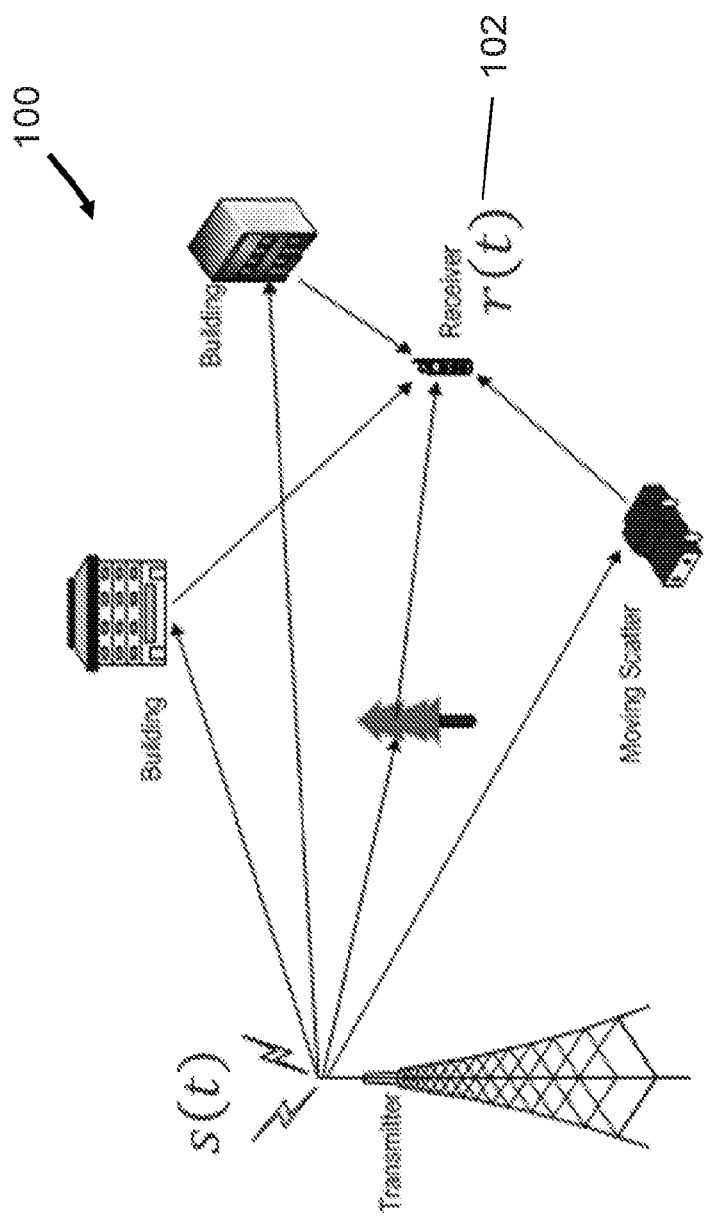
FIG. 1 shows an example communication network.

FIG. 1 shows an example communication network 100 in which the disclosed technologies can be implemented. The network 100 may include a base station transmitter that transmits wireless signals s(t) (downlink signals) to one or more User Equipment (UE) receivers 102, the received signal being denoted as r(t), which may be located in a variety of locations, including inside or outside a building and in a moving vehicle. The UEs may transmit uplink transmissions to the base station. The technology described herein may be implemented in a receiver of any UE such as the one described in 102 or in the receiver of a base station (BS).

An example system with OTFS modulation parameters described below is considered in this document. In the example system, Nv is 512 and Nh is 16. In some embodiments, a 2D spreading sequence, or basis, may also be a part of this design. When Nv=512 and Nh=16, there will be 512×16 QAM symbols (8K) per OTFS frame. Based on the QAM level (BPSK, QPSK, 16QAM, 64QAM, ... ) level, an OTFS frame would carry 8K, 16K, 32K ... bits of information. In the example implementation, channel bandwidth (BW) considered in 10 MHz. The number of OTFS frames transmitted is approximately 1000 frames per second. When the BW doubles, the number of frames per second will double, thus enabling double the throughput. An OTFS frame in (f, t) domain is padded with appropriate cyclic suffix (CS) and prefix (CP). This will contain (512+CP+CS)×16 complex samples. This frame, after serialization gets transmitted after appropriate up-sampling and up-conversion.

Some terms and their example embodiments are described next.

OTFS frame or OTFS symbol or Data frame—OTFS modulated (2D modulation) data symbol. This frame resides in the (delay, Doppler) also called ($\tau$, $\nu$) domain. In the ($\tau$, $\nu$) domain, OTFS frame is a matrix of QAM symbols of size (Nv×Nh). Transformation to other domains are possible by means of Simpletic Fourier Transform which is achieved by Discreet Fourier Transform (or Fast Fourier Transform). Conversion from ($\tau$, $\nu$) to (frequency, time) also called (f, t) is achieved by performing a 2D FFT on a frame in ($\tau$, $\nu$). A 1D FFT on a ($\tau$, $\nu$) frame along the Doppler dimension (Nh) gives rise to a frame in ($\tau$, t) whereas a 1D FFT along the delay dimension (Nv) gives rise to a frame in (f, $\nu$).

A sample—At the transmitter, the above OTFS symbols are up-sampled and fed to the ADC. They are called transmit samples. Similarly, the received analog signal at the OTFS receiver is sampled and goes through a down conversion process. At different stages of the receiver each QAM symbol could be constituted by one or more samples.

Pilot Frame—An OTFS frame of pilot symbols. This is a frame constituted on a sparse grid. In the current system each pilot symbol (512×1 matrix in this realization) is interleaved with a data frame. 16 such pilot symbols constitute a pilot frame.

Carrier Offset Recovery—the process of detecting carrier phase/frequency offset and using a) one-time frequency correction and b) a continuously tracking phase-locked loop (PLL) to lock the phase and frequency to the transmit carrier.

Frame Detection/recovery—the process of aligning the receiver to the start of OTFS frame to the nearest symbol interval.

Timing Offset Recovery—the process of detecting fractional symbol timing phase offset and aligning the receiver sample phase to the most "appropriate" value either by using a PLL or a one-time symbol timing phase correction.

Symbol timing—the process of adjusting the receiver timing phase by a fractional (QAM) symbol timing offset. Timing offset recovery and symbol timing are used interchangeably.

Carrier Offset recovery, Frame Detection and symbol Timing recovery constitute synchronization.

Pilot auto-correlator—Performs a sample-by-sample linear correlation of the received pilot with the subsequent received pilot. Information from this is used for carrier frequency offset detection and adjusting the AGC gain.

Matched Filter (MF) correlator—It correlates a received pilot with the original transmitted pilot sequence. Information from this is for symbol timing and absolute carrier phase offset detection.

Figure 2:
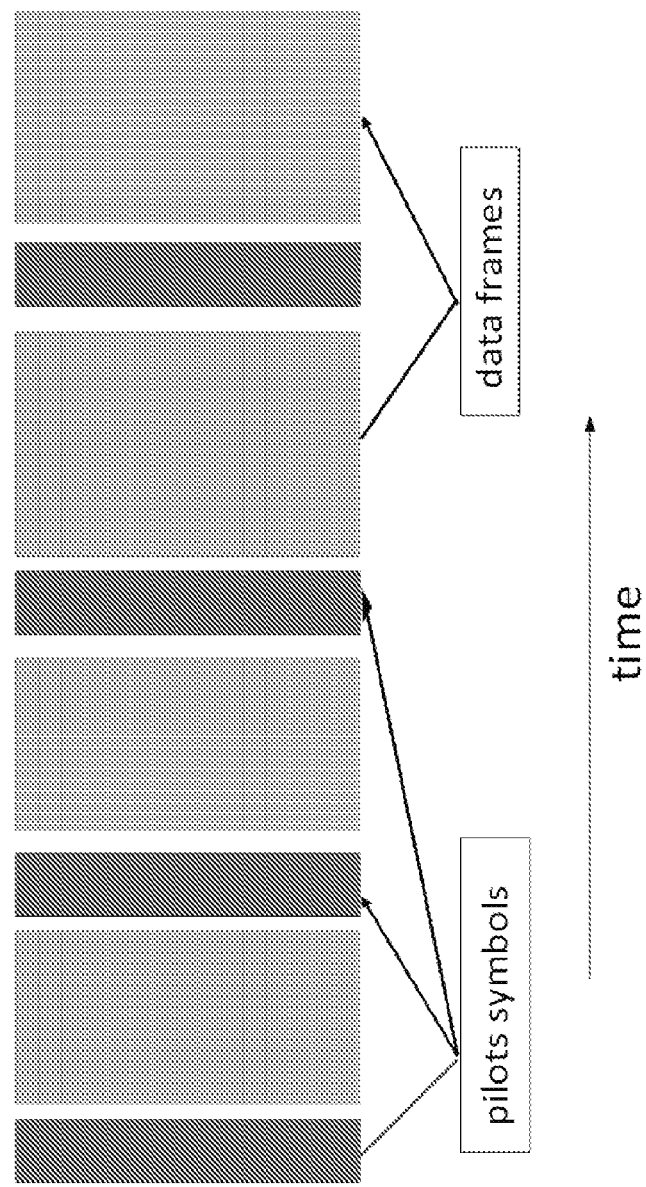
FIG. 2 shows an example of multiplexing data and pilot symbols.

FIG. 2 shows the multiplexing of data and pilot frames in this example. In the depicted example, pilot signals have been interleaved at regular intervals with data frames (called pilotsymbolSpacing). In some embodiments, 16 sparsely spaced pilot symbols may constitute a pilot frame. The system may also use a schedule and data frames can be present or absent as per the schedule.

Figure 3:
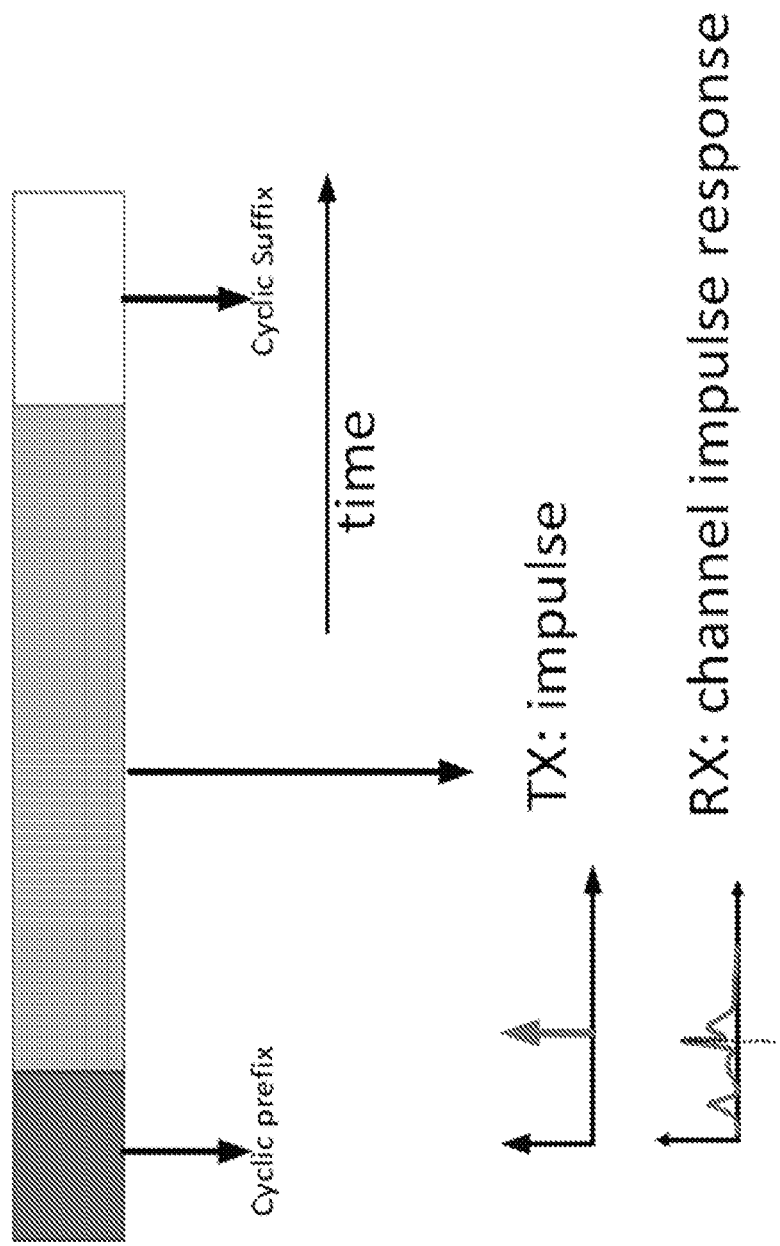
FIG. 3 shows an example structure of a pilot frame.

FIG. 3 shows an example structure of a pilot symbol. Time is represented on the horizontal axis. A pilot frame may comprise a cyclic prefix (CP), followed by a pre-defined signal field, followed by a cyclic suffix (CS). The signal field may include an impulse function, and at the receiving side, the corresponding received signal may therefore represent channel response.

Figure 4:
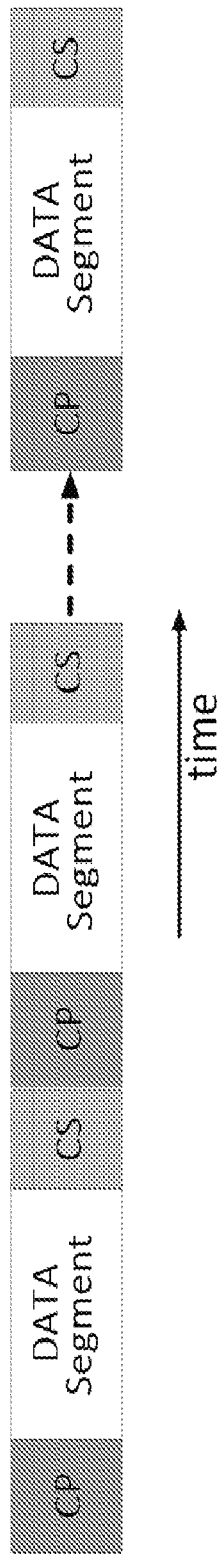
FIG. 4 shows an example structure of a data frame.

FIG. 4 shows an example structure of a data frame. The horizontal axis represents time. Each data frame may include a CP, followed by a data segment, followed by a CS. For example, data segment may be Nv symbols in duration, where Nv=512. A data frame may include Nh number of data segments. For example, Nh=16 may be used in some implementations.

Figure 5:
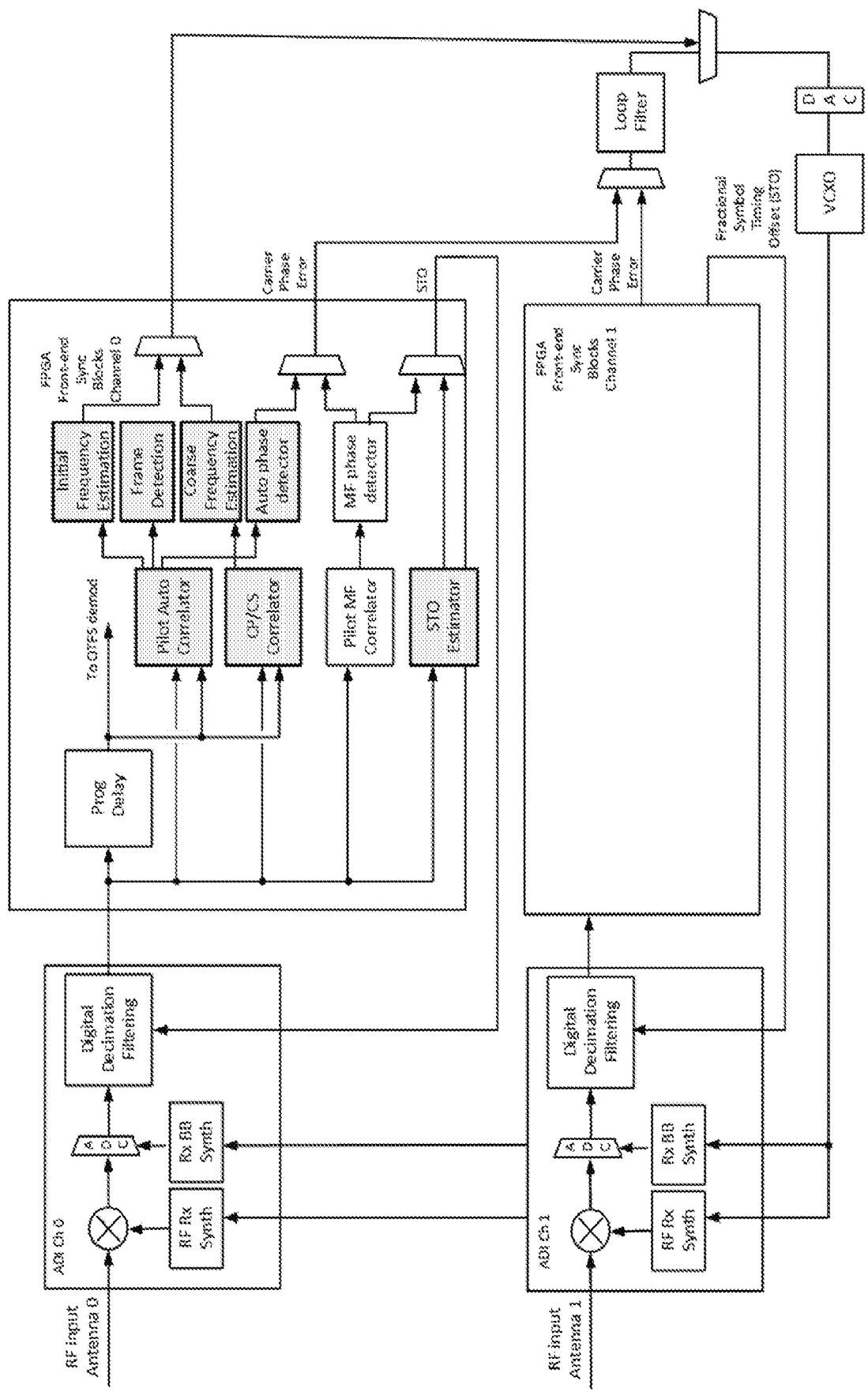
FIG. 5 is a block diagram highlighting examples of different blocks in receiver synchronization, their interconnections and their connection to the receiver front end.
Figure 7:
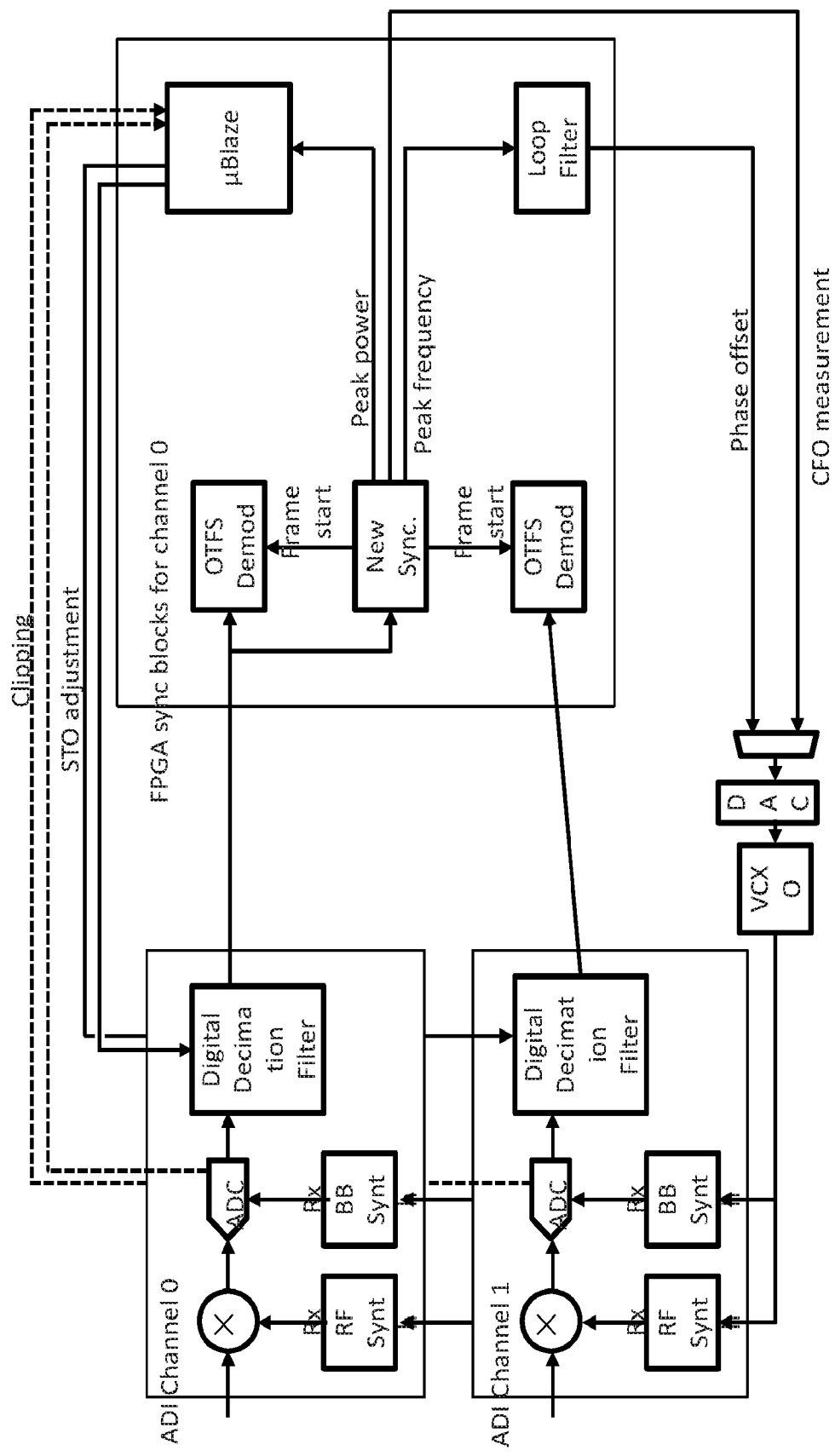
FIG. 7 shows a block diagram of an example implementation of synchronization highlighting the top level control aspects.

FIG. 5 is a block diagram of an example implementation of receiver synchronization. It shows interconnections of sub-blocks that constitute synchronization system. It also describes how the synchronization system is connected to the receiver front end (FE). The label ADI refers to Analog Devices company which sells Integrated Circuits that implement the FE, shown as an example implementation in FIG. 5. In the depicted example, a receiver design with two receive antennas is depicted. The RF signal received at each antenna may be processed through analog to digital conversion stage (ADC) in which the signal may be down-converted into baseband signal using a local Voltage Controlled Oscillator (VCO) or a local Voltage Controlled Crystal Oscillator (VCXO). The baseband signal may be converted from analog to digital domain and digital decimation filtering may be performed on the signal to band limit the signal. The resulting digital signal may be processed through a sync block in which various correlator blocks may be used to perform phase and frequency estimation/detection, as described in the present disclosure. The output of the sync and detection operations may be a carrier frequency or phase error estimate and a symbol timing offset (STO) estimate. These signals may be used to generate feedback information using which the local VCXO may be adjusted and fractional symbol timing adjustment may be made to improve synchronization. Various sub-blocks in the synchronization are depicted in this diagram and they are described in the sequel. As shown in the diagram, in this example implementation, many of the synchronization blocks are implemented in Field Programmable Gate Arrays (FPGA). A few blocks and control signals, however, are implemented using a processor such as micro-blaze. These details are shown in FIG. 7 and described in detail in the sequel. Broadly speaking the control signals control the VCXO output, FE gain, decimation filter settings and provides error signal to a phase-locked loop (PLL) for frequency tracking.

FIG. 2 also shows an example of forming correlation between adjacent pilot transmissions. This technique may include correlating adjacent pilot transmissions (as shown by arrows that logically connect adjacent pilot transmissions). In some embodiments, autocorrelation may be performed at first on the received signal; following this a moving average filter of the appropriate size may be used to obtain single and clean correlation peaks irrespective of the underlying channel and noise conditions. These correlation peaks may be used to correct an initial frequency offset, coarse and fine automatic gain control (AGC) and frequency tracking using a PLL. The peak information may include information about peak position, I/Q amplitude and I/Q angle. In some embodiments, a correlator that correlates CP and/or CS signals may be used for faster frequency convergence.

Using auto-correlation of pilot transmissions instead of other alternatives (e.g., matched filtering) may provide operational benefits for a variety of reasons. For example, pilots are often used for channel sounding and so they are packed such that pilot frame spacing is relatively short in comparison to channel time variability. Therefore, coherence time, even under high Doppler situations, is typically higher than pilot frame spacing. In other words, relative variations between adjacent pilot transmissions will not be significant, even under high Doppler conditions. Therefore, a pilot auto-correlation sequence will be less susceptible to Doppler induced channel changes, and thus it may be relatively easy to discern peaks in the auto-correlation, even under extreme Doppler conditions and carrier frequency offsets. On the other hand, a matched filter based autocorrelation peak generation scheme typically matches the received pilot signals with a fixed sequence, and often is susceptible to Doppler and frequency offsets. Therefore, in some embodiments, matched filtering may be unsuitable for frequency offset determination.

In some embodiments, data frames may be scrambled so as to eliminate unwanted data correlations, which may lead to false correlation peaks.

Figure 6:
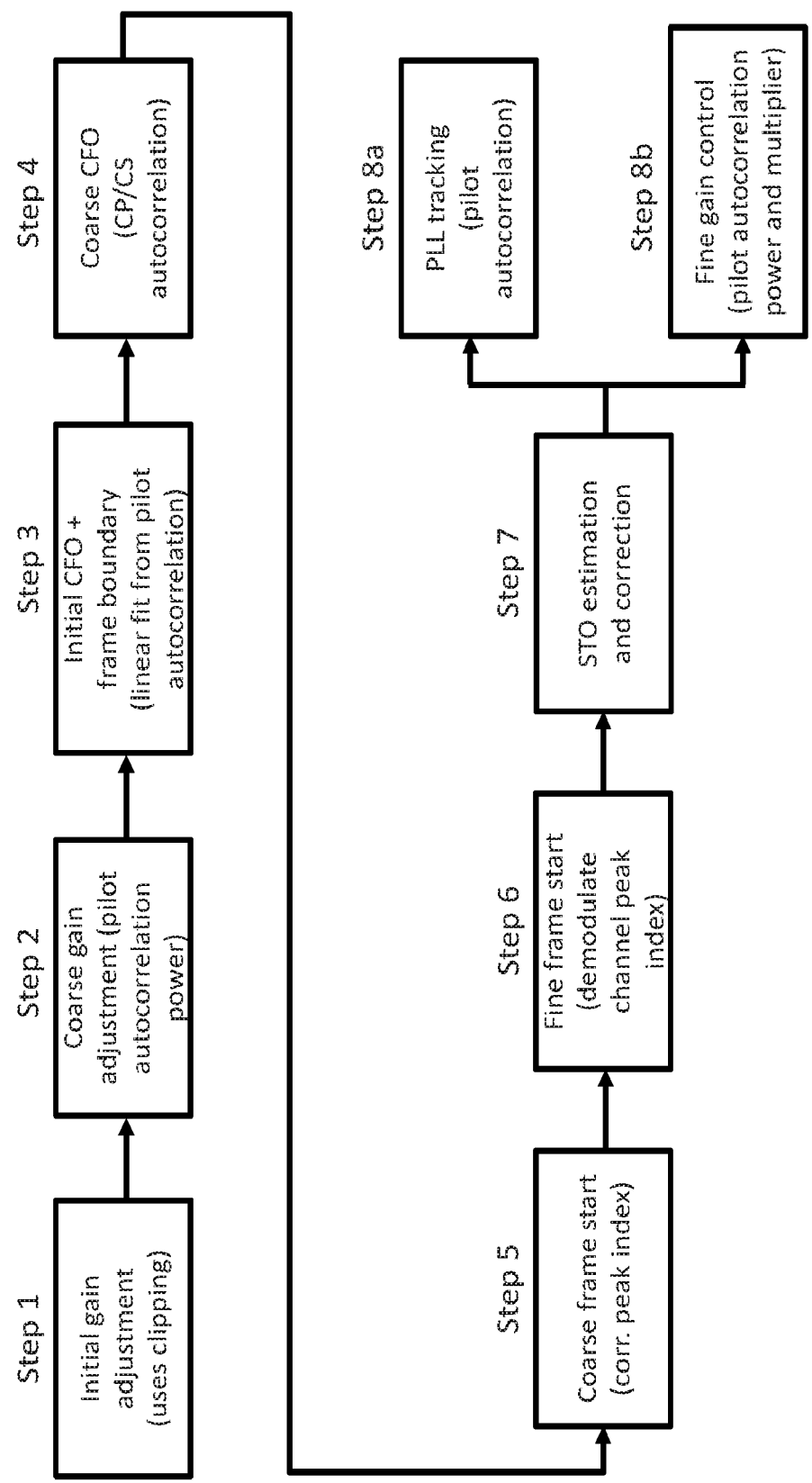
FIG. 6 shows a flowchart for signal processing performed in one example implementation of receiver synchronization and AGC circuitry/algorithm.

FIG. 6 shows a flowchart for signal processing performed in one example implementation of receiver synchronization and AGC algorithms. Note that synchronization and AGC are intertwined and they are adjusted in a progressive manner. Initially the receiver gain is adjusted to obtain a reasonable receive signal quality, followed by a gross correction of carrier and clock offsets, followed by more accurate adjustments of AGC and synchronization in several stages. Briefly, the following steps may be performed.

Step 1: initial gain adjustment. At the beginning, the modem receiver typically has no idea about the strength of the input signal. It may be too weak or too strong. So set the initial AGC gain to the maximum possible. If the incoming signal is too strong, it will cause clipping in the Analog to Digital converter. As a first step, sense the clipping and perform gross adjustment of the receiver front end gain such that signal after gain stabilization is not clipping any more.

In some embodiments, the initial gain adjustment may be performed using code running on a microprocessor.

Step 2: coarse gain adjustment. Pilot autocorrelation peaks can be used to estimate the incoming signal power at this stage (taking the average amplitude of the correlation peaks and use a look up table). However, this estimation need not be very accurate as the signal peak amplitudes themselves will be highly varying if there is high carrier frequency offset or Doppler offset. Hence this power estimation and associated gain adjustment will be coarse. In some embodiments, the coarse gain adjustment may be performed using a combination of code and FPGA.

Step 3: using the pilot autocorrelation peak positions estimate the gross carrier frequency error. It is customary that the carrier frequency and QAM symbol frequency are derived from the same crystal oscillator (frequency synthesizer/VCO) at the transmitter and receiver. If there is a big carrier frequency offset, there will be a proportional clock frequency (symbol clock) offset as well. This will get manifested as a gradual drift in the pilot auto-correlation peak positions. Collecting the auto-correlation peak positions over a long period (for example 1000 peak positions) and performing a linear fit as described in the sequel can give a good estimate of the symbol frequency drift. Oscillator frequency offsets as high as 20 to 25 parts per million (ppm) can be estimated using this method. After the estimation, the corresponding correction is applied to the VCXO at the receiver. Once the correction has taken effect, the expected frequency offset is much smaller. In this example realization, this could be typically less than 2 ppm. At this stage, correlation peaks will be well stabilized and they can be used for a) a more accurate estimate of the received power and b) OTFS Frame start.

Step 4: Coarse carrier frequency offset (CFO) correction. Correlating samples that are 512 samples apart (in this example realization) will produce 16 distinct peaks for the data frame and 1 peak for the pilot sub-frame. Each of these peaks can be used to compute the remaining frequency offset as described later. This is called the coarse frequency offset. Once estimated, it can be corrected at the VCXO.

Step 5: Determination of coarse frame start (frame start detection). Correlation peak index may be used for this step.

Step 6: Fine frame start estimation is performed using demodulated channel peak index.

Step 7: Symbol timing offset (STO) estimation. This may be performed using interpolation of the channel response amplitude as described in detail later.

Step 8a: At this stage, the carrier frequency offset is expected to be a few Hz, frame detection is functional and the symbol timing offset is insignificant. From the phase values of the pilot-auto-correlation peaks, the frequency error can be estimated. Note that these error values are obtained at regular intervals (in this case—1 ms). This is fed into a 2nd order PLL, which tracks the carrier frequency offset at the receiver.

Step 8b: Receiver Gain need to be tracked to account for the slow varying power variations. This can be achieved by computing the received power from the pilot auto-correlation peaks.

In some embodiments, Steps 1-8 could be performed partly in hardware circuits and partly using one or several microprocessors. FIG. 7 shows a block diagram of an example implementation of synchronization highlighting the top level control aspects. FIG. 5 shows some exemplary functions used by the synchronization sub-system. As shown in FIG. 7, the synchronization output (New Sync) includes a frame start indication to the OTFS demodulator, a peak power and peak frequency indication to the microprocessor and the loop filter respectively and a carrier frequency offset (CFO) measurement to the feedback signal for adjusting the oscillator.

Figure 8:
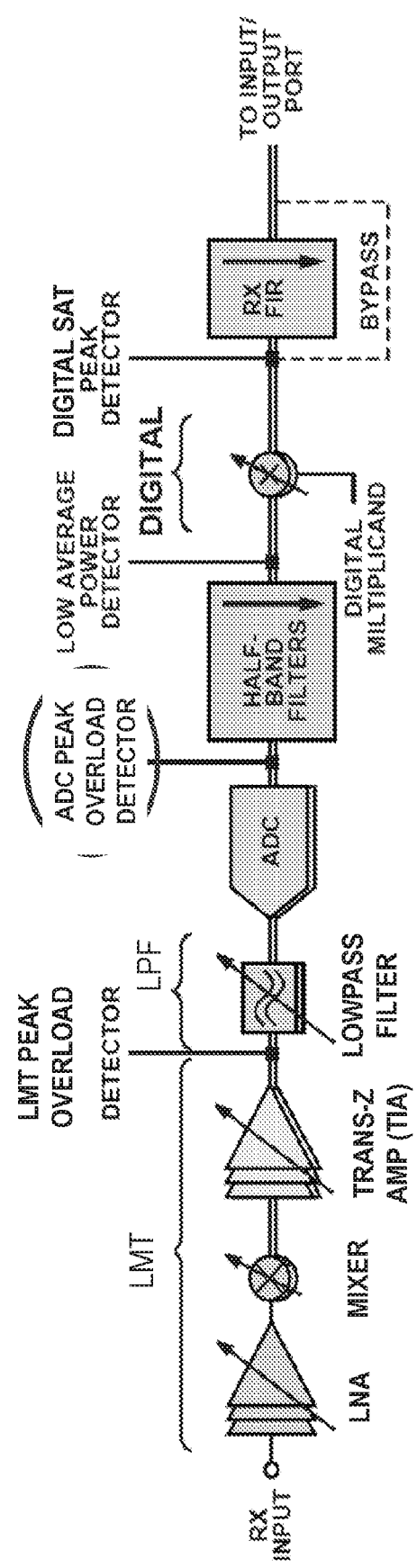
FIG. 8 shows an example of the Front End (RF to Base Band) processing chain, highlighting Step 1 (the initial gain adjustment) of AGC described in FIG. 6.

FIG. 8 shows an example implementation of the Front end receive processing chain. From left to right in FIG. 8, a received signal may be amplified through low noise amplifier (LNA) and down converted using a mixer. Mixer output may be processed through a trans-impedance amplifier. This signal is processed through a lowpass filter to filter out-of-band signal. The low pass filtered signal is digitized by an analog to digital convertor (ADC). As described earlier, initially, since the signal strength is unknown, the receiver front end is set to maximum gain. If the input is not very weak, this gain can cause clipping at the ADC. A peak overload detector may detect peaks at the digital output. Looking at the clip statistics, initial AGC gain need to be adjusted (one or more times) such that signal at the output of the ADC is not clipped.

The digital signal from ADC may be filtered through a half-band filter and down sampled. A digital gain correction mechanism may also be part of the FE. The resulting signal may output to a port for further processing such as pilot autocorrelation detection. As further shown in FIG. 8, the output of the ADC may be used for the peak overload detection and the output of the halfband filter may be used for low average power detection. A digital multiplicand is used to generated signal for peal detection.

Figure 9:
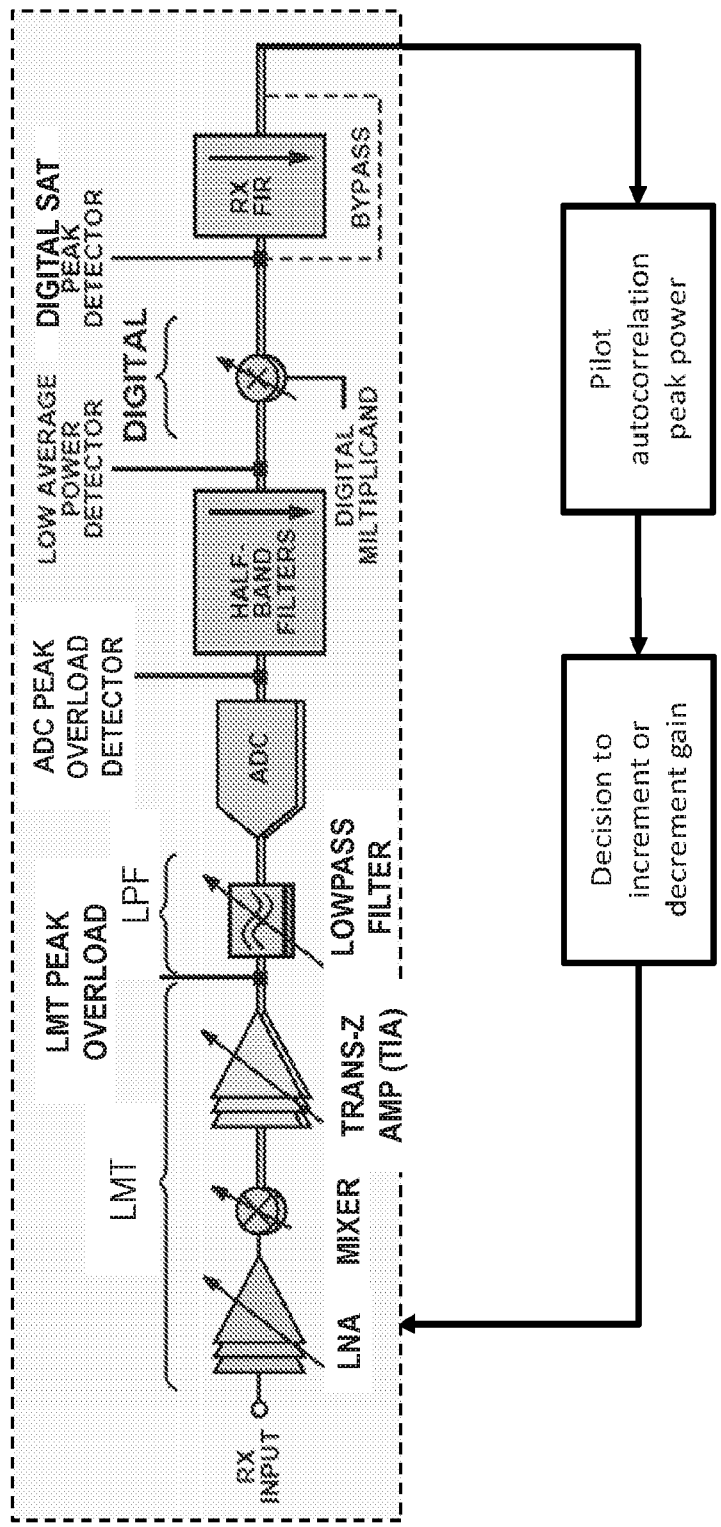
FIG. 9 shows an example of Step 2 (AGC coarse gain control) of FIG. 6.

FIG. 9 highlights Step 2 (coarse gain control of AGC) of FIG. 6. The circuit shown in FIG. 9 may be configured to operate at a receiver gain such that the received signal is within a few dB to the reference signal. In this scenario, pilot autocorrelation peak amplitude may be proportional to the received power. This may be used to perform coarse gain control that includes a decision to increment or decrement the gain.

The average power of a sequence, represented as r(n) may be written as:

$$P(n) = \frac{1}{N}\sum_{i}^{N} r(n) * r^*(n) \qquad \text{Eq. (1)}$$

If the signal doesn't undergo much change in N samples, one can approximate r(n) r(n−N). Thus Eq. (1) may be re-written as $$P(n) = \frac{1}{N}\sum_{i}^{N} r(n) * r^*(n-N) \qquad \text{Eq. (2)}$$

Eq. (2), therefore, maps correlation peak amplitude to received signal power.

Figure 10:
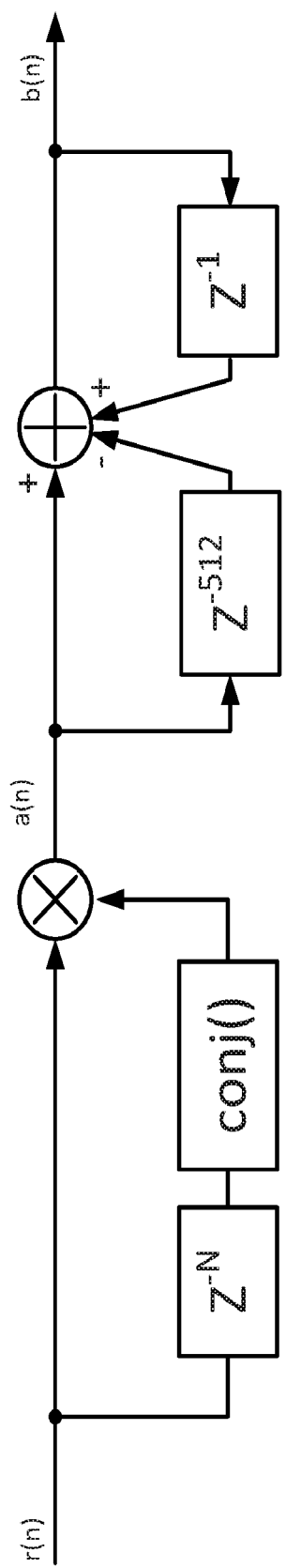
FIG. 10 shows an example of a circuit for calculating autocorrelation of pilots that are N (one OTFS frame) samples away.

FIG. 10 shows an example of a circuit for calculating pilot autocorrelation using the above-described equations. The box "Z" represents a unit delay in the digital domain. The output of the above circuit can be written as:

$$b(n) = \Sigma_{k=n-511}^{n} r(k) \times r^*(k-N) \qquad \text{Eq. (3)}$$

The value of 512 unit delay is used as an example only.

Figure 11:
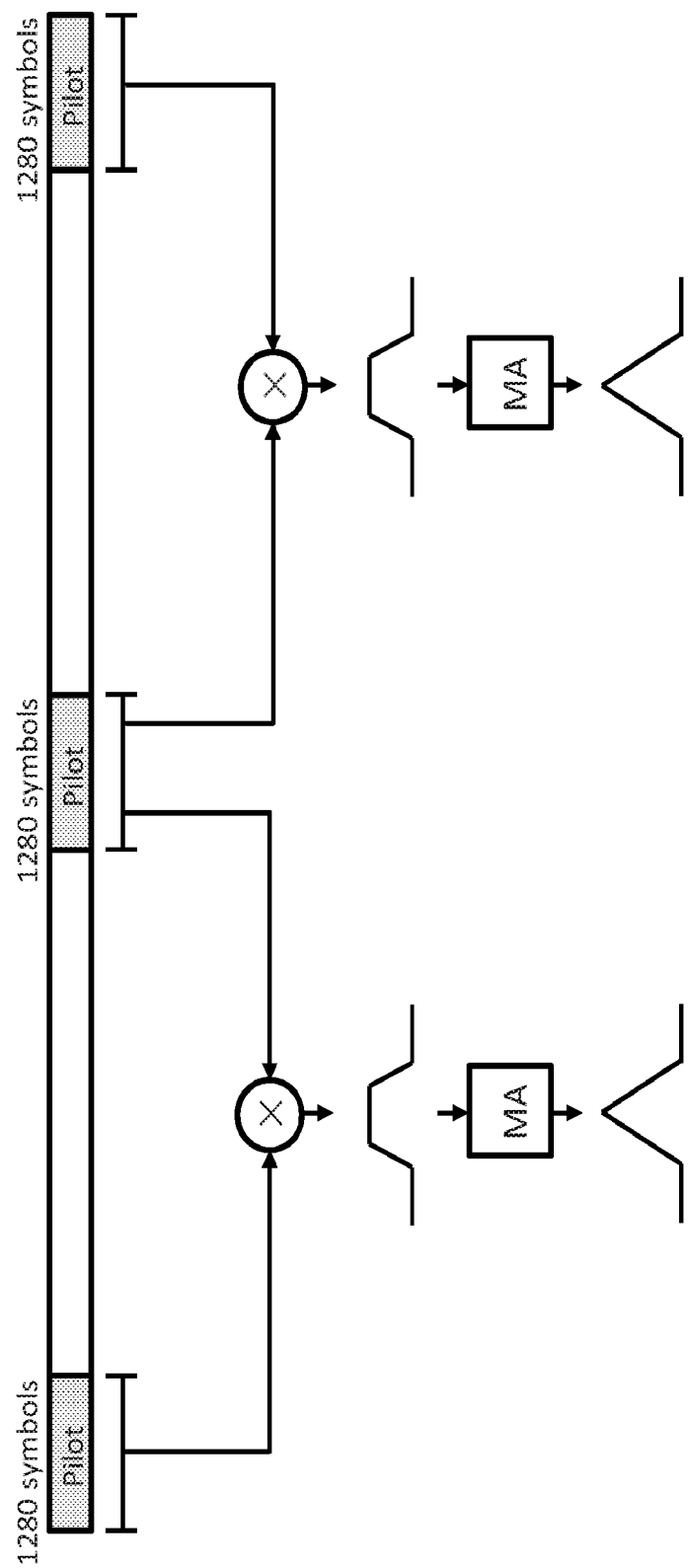
FIG. 11 shows example waveforms after auto-correlation and moving average (MA) filtering, depicting an example where correctly designed moving average filter entails a single peak irrespective of the underlying channel.

FIG. 11 shows an example of waveforms after auto-correlation and moving average (MA) filtering. As shown in FIG. 11, for example, the autocorrelation peak for pilot detection may not be a single peak but may be a flat top curve, with the width of the flat top representing ambiguity of the exact location of the pilot obtained from the autocorrelation based coarse granularity detection. The width of the flat top is a function of the channel length; lower the channel length, higher the width. FIG. 11 highlights the fact that correctly designed MA filter entails a single peak irrespective of the underlying channel.

Figure 12:
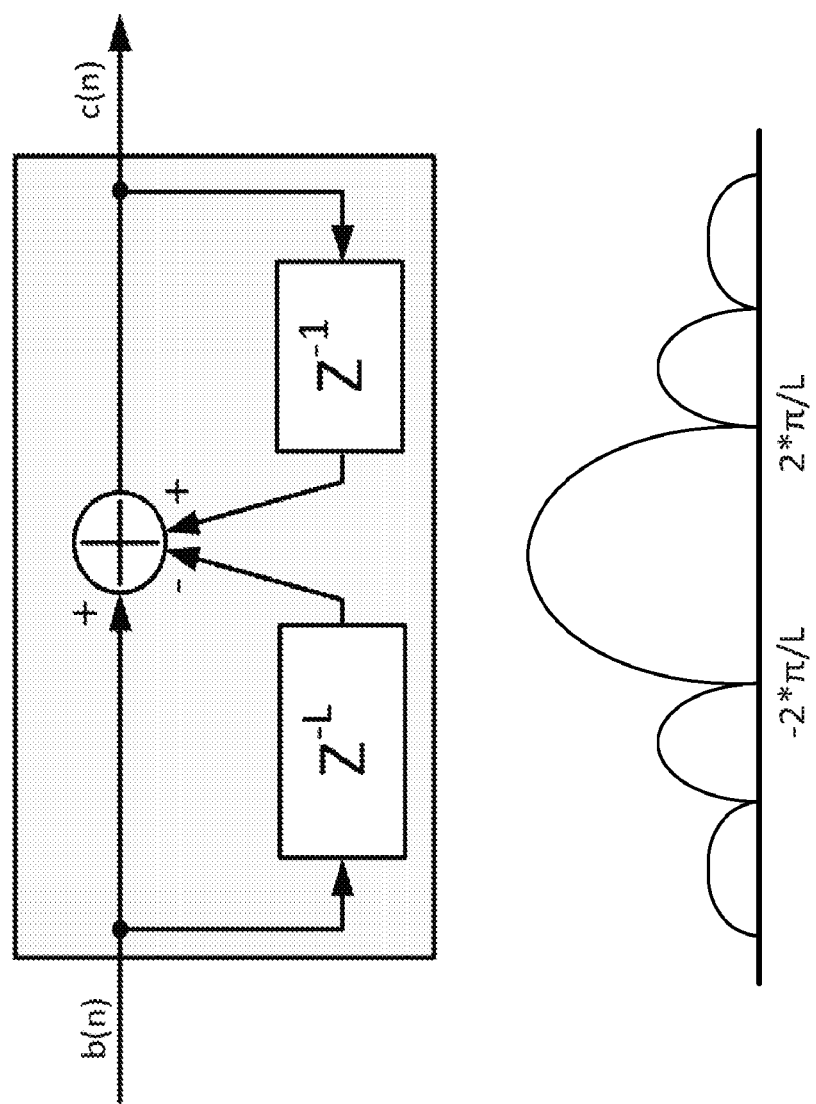
FIG. 12 shows an example of moving average filter design criteria.

FIG. 12 shows an example of a peak detection moving average filter and its frequency response. In the drawing, the output c(n) may be represented as:

$$c(n) = \Sigma_{k=n-L+1}^{n} b(k) \qquad \text{Eq. (4)}$$

The parameter L may be a programmable parameter. For example, L may be selected to be equal to the number of samples in CP and CS combined. This choice of L always avoid flat top for correlation peaks at all channel conditions. MA filter filters amplitude swings due to noise, by averaging over L samples.

Figure 13:
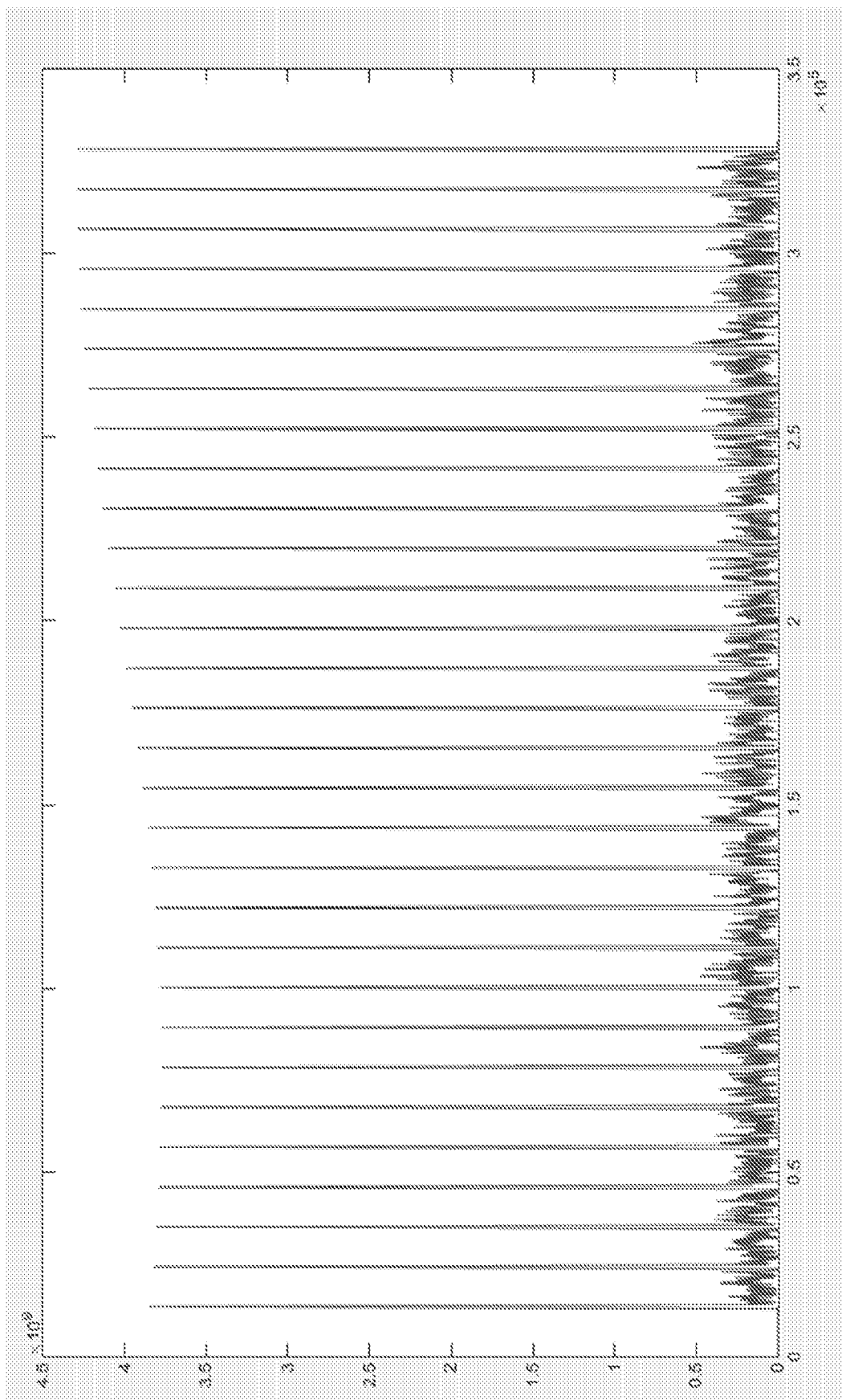
FIG. 13 is a graph of an example Matlab output of an autocorrelator.

FIG. 13 is a graph of an example output of an autocorrelator implemented according to the technique described with respect to Eq. 1 to Eq. 4. The periodicity of the peaks approximately corresponds to the periodicity of pilot signal transmissions. The heights of the peaks are also approximately proportional to the received signal power.

Figure 14:
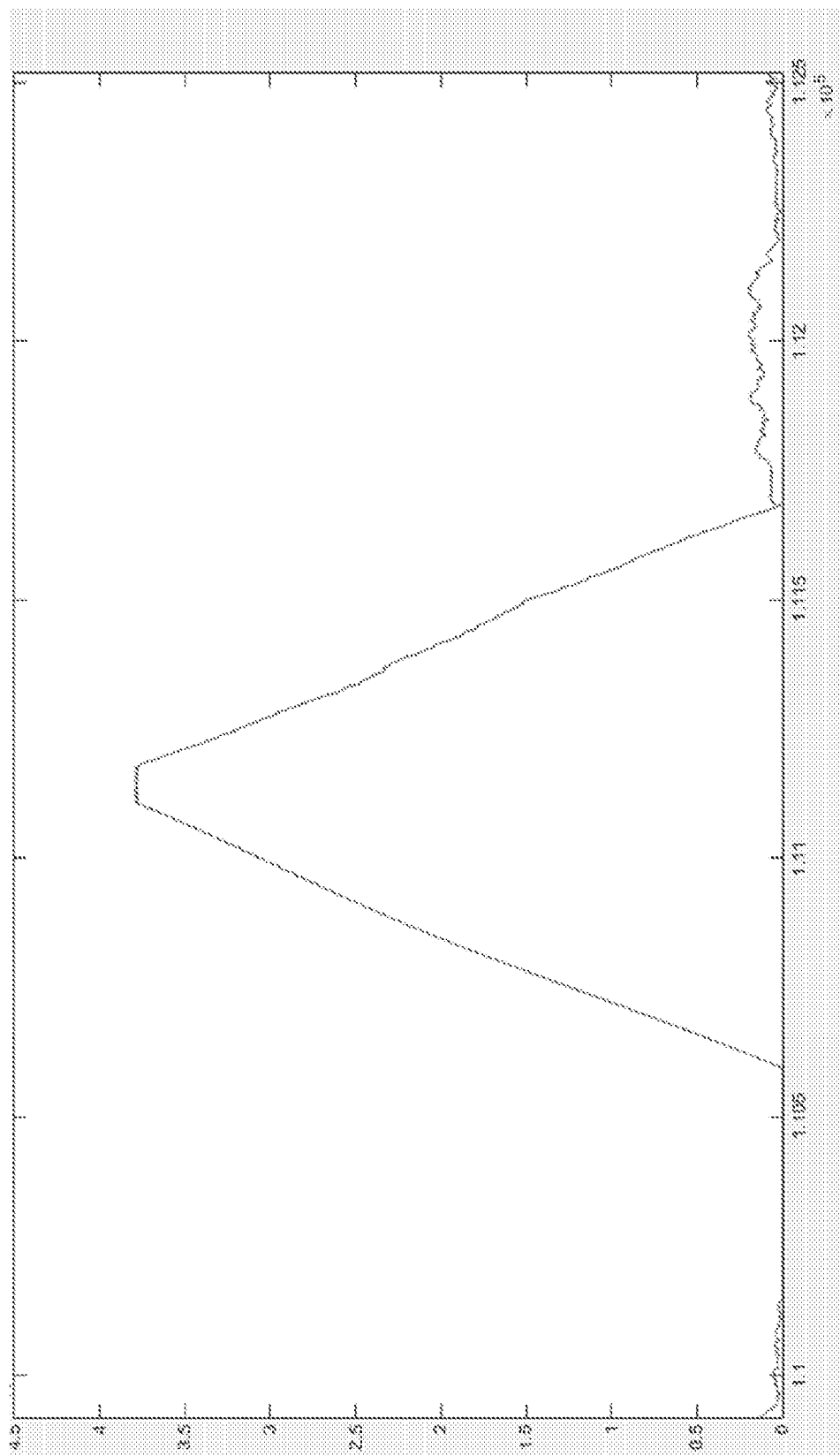
FIG. 14 shows a zoomed view of an example graph of output of an autocorrelator.

FIG. 14 shows a zoomed view of an example graph of output of an autocorrelator around one of the peaks. As previously described, the flatness of the peaks may represent the inaccuracy or ambiguity in the determination of the exact pilot locations during the coarse estimation stage.

Figure 15:
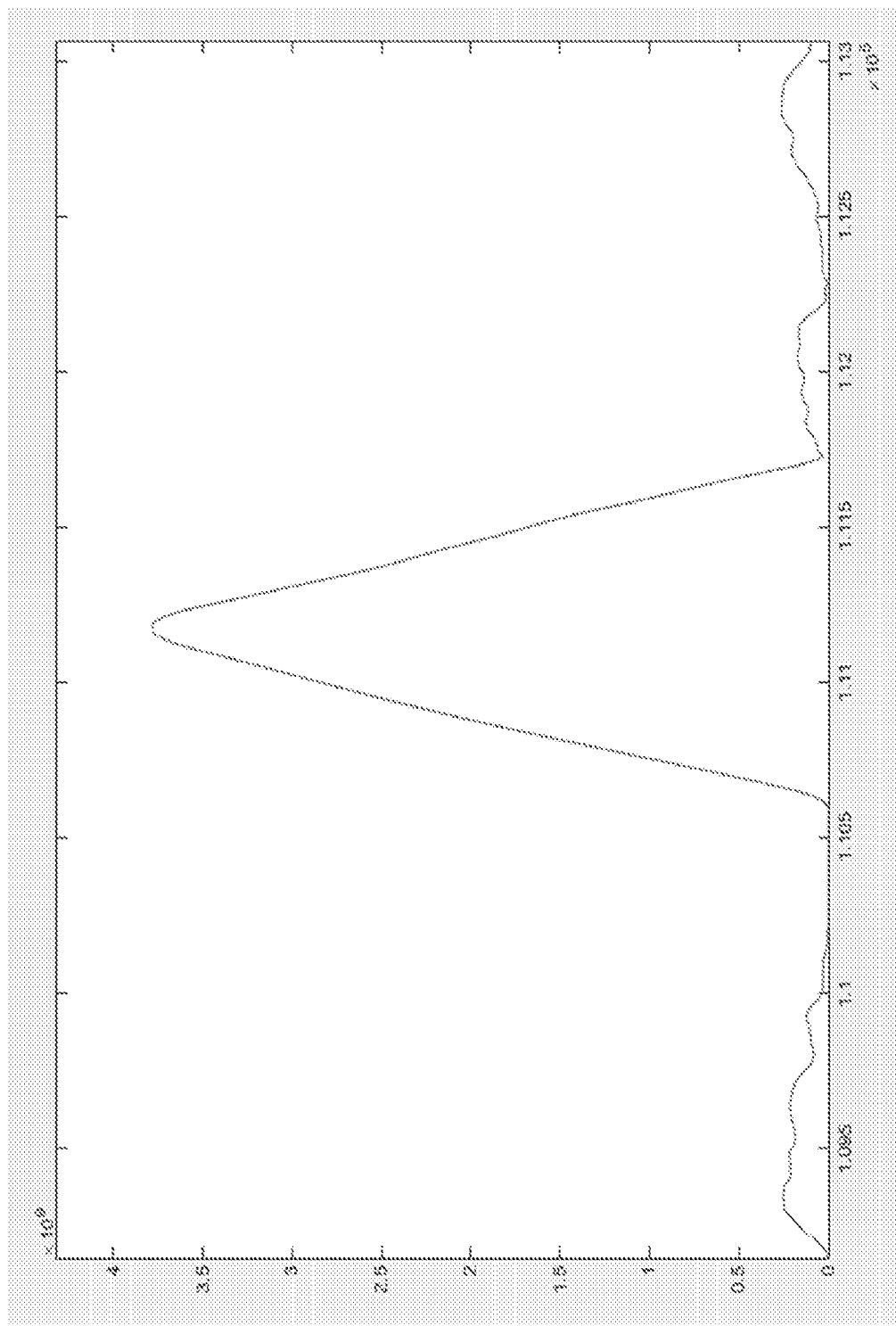
FIG. 15 shows a zoomed view of an example graph of a moving average output.

FIG. 15 shows a zoomed view of an example graph of a moving average output around one of the peaks. Using MA filter over the waveform shown in FIG. 15, outputs that have sharper peaks can be obtained. Thus, MA filtering can provide a more accurate and fine granular location of pilot transmissions.

Figure 16:
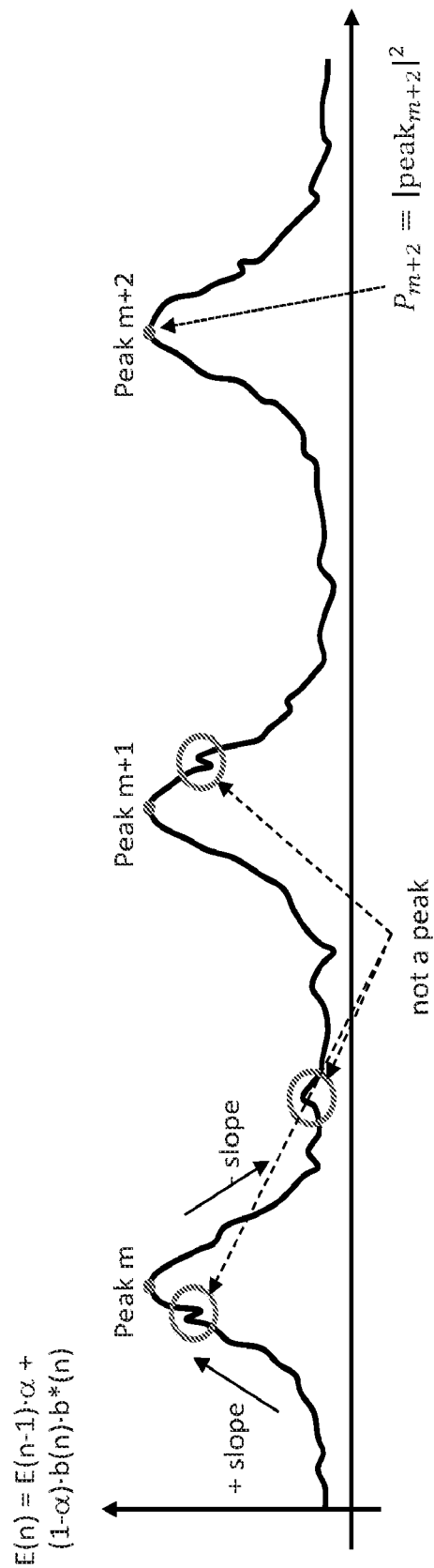
FIG. 16 shows a typical output from the MA-filter in a noisy environment.

FIG. 16 is a graphical example of successive peaks of a peak detection circuit. In the graph, the horizontal axis represents time or input sample index and the vertical axis represents correlation amplitude at the output of the MA filter after low pass filtering, computed as given by Eq (5a). Positive slope of the curve indicates that samples are increasing for G1 consecutive samples (ignoring small deviations). A negative slope is similarly detected if G2 consecutive samples are decreasing in amplitude. A peak is declared detected, if a positive slope followed by a negative slope is identified. For robust peak detection, the peak must be well above the noise floor. In this case, no threshold adjustment is needed to be done on the fly.

$$E(n) = E(n-1) \cdot \alpha + (1-\alpha) \cdot b(n) \cdot b^*(n) \qquad \text{Eq. (5a)}$$

In the above equation, b(n) represents value at time n, a is an exponential window factor. It is a real number between 0 and 1, and E(n) represents power estimate at time n.

Initial Coarse Carrier Frequency Offset (CFO) Estimation and Correction.

Transmit & Receive VCOs are free running oscillators. Even if both the VCOs are set to identical operating points, the frequency deviation between them could be significant. For example, these oscillators can have a deviation as high as 22 ppm. For synchronization at the receiver, both these VCOs need be synchronized. Objective of the initial Frequency adjustment is to bring down this difference to less than a tenth of the original offset, for example 2 ppm. In some implementations, the symbol clock (e.g. 10 MHz) and carrier frequency (e.g., 3.6 GHz) are derived from the same VCO clock (e.g. 40 MHz). By synchronizing the VCOs of Transmitter and Receiver, symbol clock and carrier frequency synchronization can be achieved. A large VCO frequency offset will result in a symbol clock offset that is measurable in a fairly large observation window (e.g., 1 second).

Figure 18:
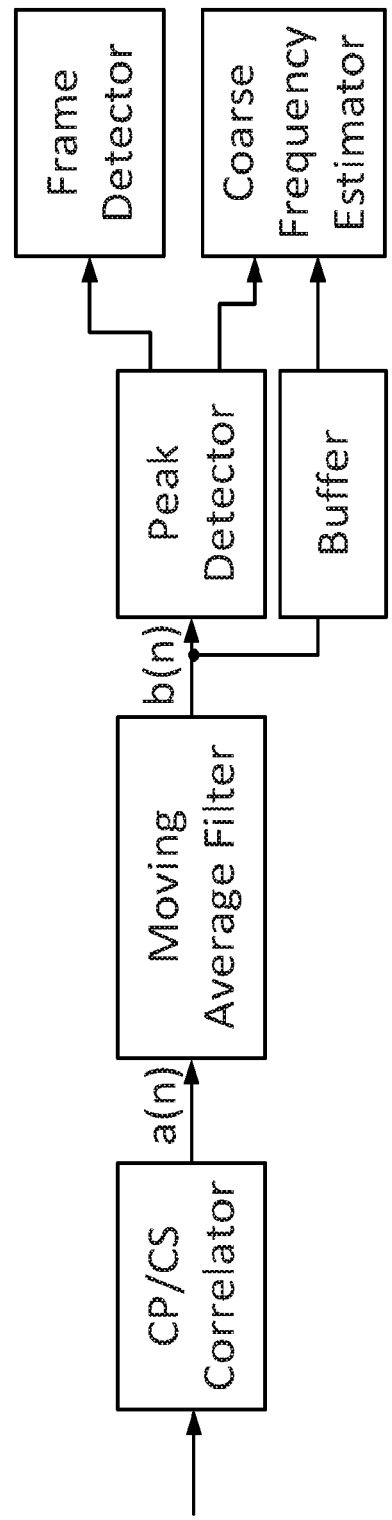
FIG. 18 shows an example of a coarse frequency and OTFS frame detection scheme.

With reference to FIG. 18, the following equations can be written for the horizontal and vertical axes, where $x_i$ represents consecutive pilot number (1, 2, . . . ) and $y_i$ represents the corresponding symbol clock count for the correlation peak for i-th pilot. In an example implementation, peak detection and the corresponding symbol clock count can be realized in hardware. If there is no clock drift, a line can be drawn connecting these points and the slop of that line will be equal to the pilot frame spacing (in the given figure it is 10856 symbol clock counts). However, when the transmitter and receiver clocks are not synchronized, these points need not be lying on a line. A line can be fitted in the lest square sense as described below.

$$(x_i, y_i) \text{ for } i=1,2,\ldots,N \qquad \text{Eq. (5b)}$$

The slope can be expressed as $$\text{slope} = \frac{Ns_{xy} - s_x s_y}{Ns_{xx} - s_x^2} \qquad \text{Eq. (6)}$$

Where $$s_x = \sum_{i=1}^{N} x_i, \; s_y = \sum_{i=1}^{N} y_i, \; s_{xy} = \sum_{i=1}^{N} x_i y_i, \; s_{xx} = \sum_{i=1}^{N} x_i^2 \qquad \text{Eq. (7)}$$

Let $t_{pilot}$ denote the time interval between 2 consecutive pilot sub-frames, $f_{exp}$ denote the number of symbol clock cycles per second when the transmitter and receiver are synchronized and $\Delta f_c$ denotes the symbol clock frequency deviation between the transmitter and receiver, then it can be seen that $\lambda f_c$ is given by, $$\Delta f_c = \frac{\text{slope}}{t_{pilot}} - f_{exp}. \qquad \text{Eq. (8)}$$

Figure 17:
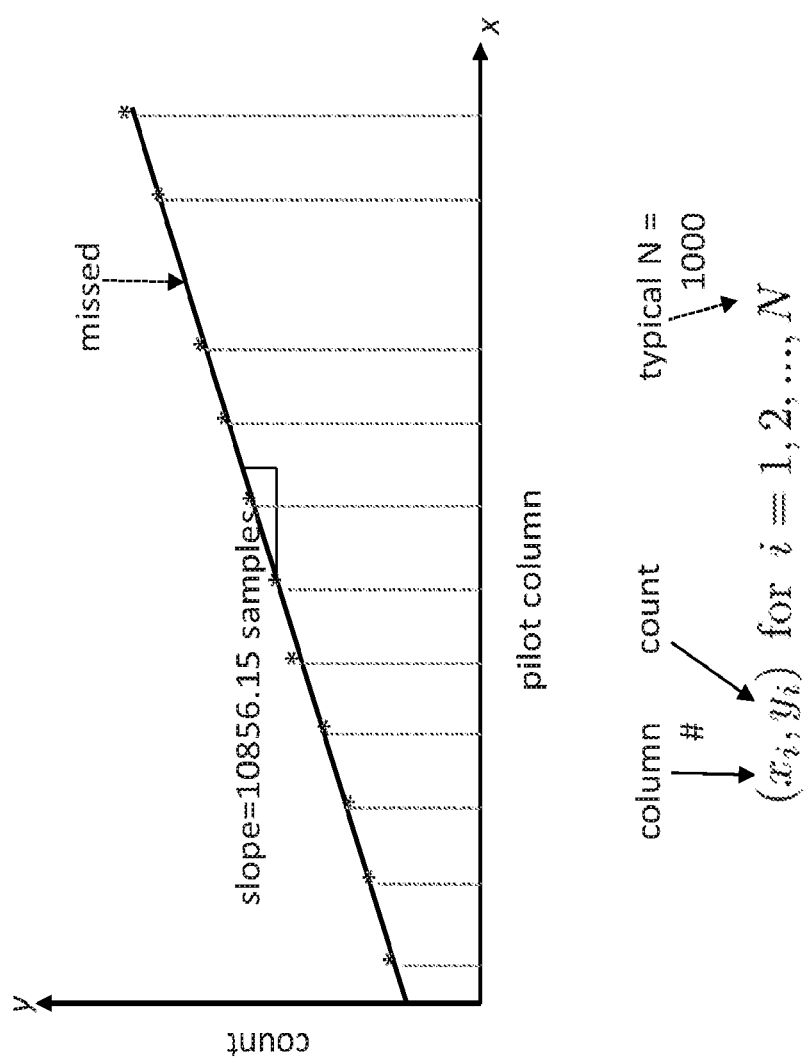
FIG. 17 shows an example graph of a series of pilot autocorrelation peaks and their positions. In some embodiments, this information is used for initial Carrier Frequency Offset estimation (e.g., Step 3 in FIG. 6).

FIG. 17 shows an example graph of a linear fit for pilot autocorrelation peaks. This symbol frequency error estimate can appropriately be scaled to obtain and correct the initial coarse VCO error.

In some implementations, the carrier frequency may nominally be a large multiple of VCO frequency (e.g., 90 times the VCO frequency). Due to this multiplicative factor, any 'mis-alignment' in the VCO frequency will results in high carrier frequency offset. In some embodiments, the initial frequency estimation is based on VCO frequency drift measurement (as described in the previous section). The inaccuracy could still result in a fairly high carrier frequency offset. However, it has been found empirically that the above VCO estimation and correction usually results in a residual carrier offset error that is much less than half the sub-carrier width (for example <~9 KHz (½*1/512*1/(10*10^6) for 10M symbols/second transmission)). Coarse CFO estimation/correction may be applied further, to bring down the carrier frequency offset to sub 100 Hz range.

Coarse Frequency Estimation and Correction

FIG. 18 shows an example of a coarse frequency estimation scheme. Input signal is passed through a CP/CS correlator to produce a sequence a(n) (e.g., as described with respect to FIG. 10, e.g., signal b(n) in this figure). The resulting signal is then filtered through a moving average filter as described in FIG. 12. The peaks of the output are detected using a peak detector (for example, as described with respect to FIG. 16). In this example embodiment, there will be 17 such peaks, 16 of them corresponding to the OTFS data frame and one for the pilot sub-frame. Peaks that correspond to the data frame occur with equal distance between peaks. However, the distance between pilot-peak and data peak need not be equal to this. The coarse frequency estimator takes the location of each of the 16 data peaks (corresponding to each antenna), computes the phase of each peak and uses this information to determine a coarse carrier frequency offset estimate (more details below).

Figure 19:
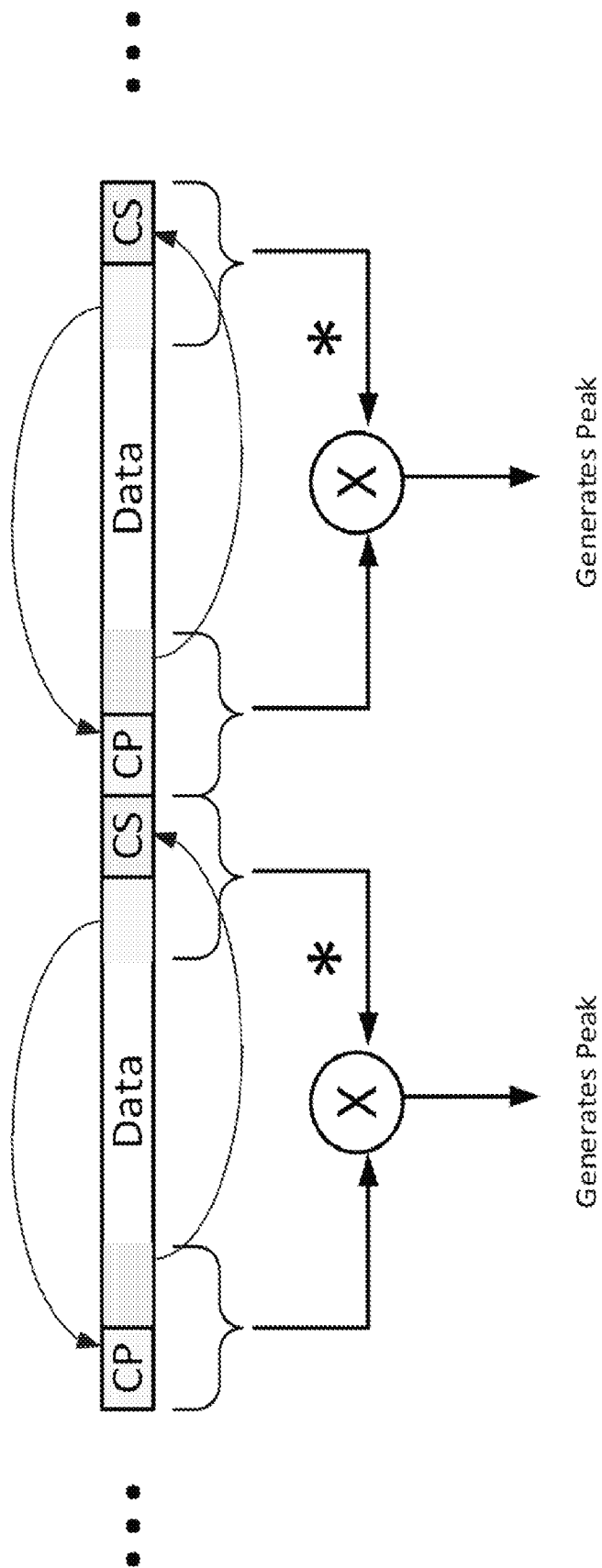
FIG. 19 shows an example of calculating correlation in transmissions with a cyclic prefix and a cyclic suffix.

FIG. 19 shows an example of calculating correlation in transmissions with cyclic prefix. To provide a cyclic extension of the transformed data, the end of the data may be inserted before the beginning as a cyclic prefix (CP) and the beginning of the data is inserted after the end as a cyclic suffix (CS). Performing correlations spaced by 512 samples gives a peak for each of 16 data columns and one pilot column in a frame. In some embodiments, the scheme depicted in FIG. 19 provides 17 phase measurements in one frame with no change to signaling structures.

Figure 20:
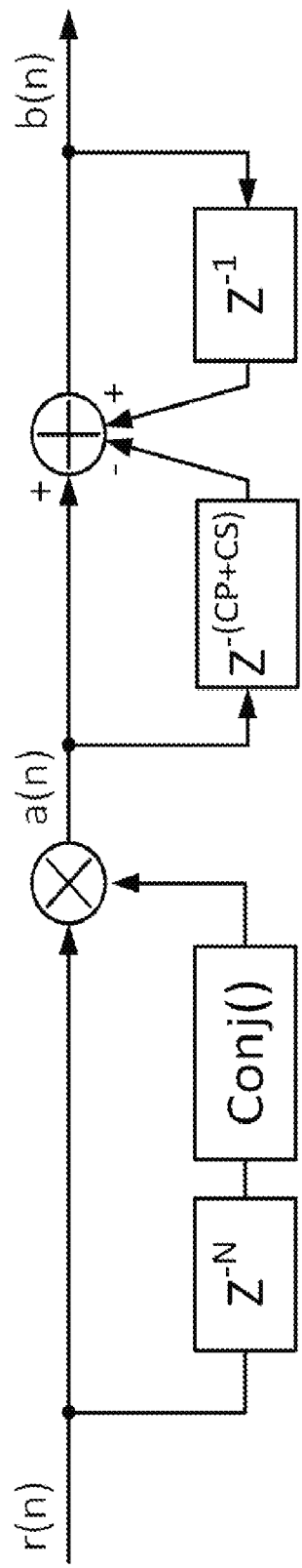
FIG. 20 shows an example of a circuit for calculating autocorrelation between the data and its CP which are separated by N samples.

FIG. 20 shows an example of a correlation calculation scheme, wherein "conj" refers to the conjugate operation.

In FIG. 20, the following relation holds:

$$a(n) = \Sigma_{k=n-CP-CS+1}^{n} r(k) \times r^*(k-N) \quad \text{Eq. (9)}$$

The value N=512 may be used in some implementations. In some embodiments, the circuit shown in FIG. 20 may be used to calculate the autocorrelation between CS and data.

Figure 21:
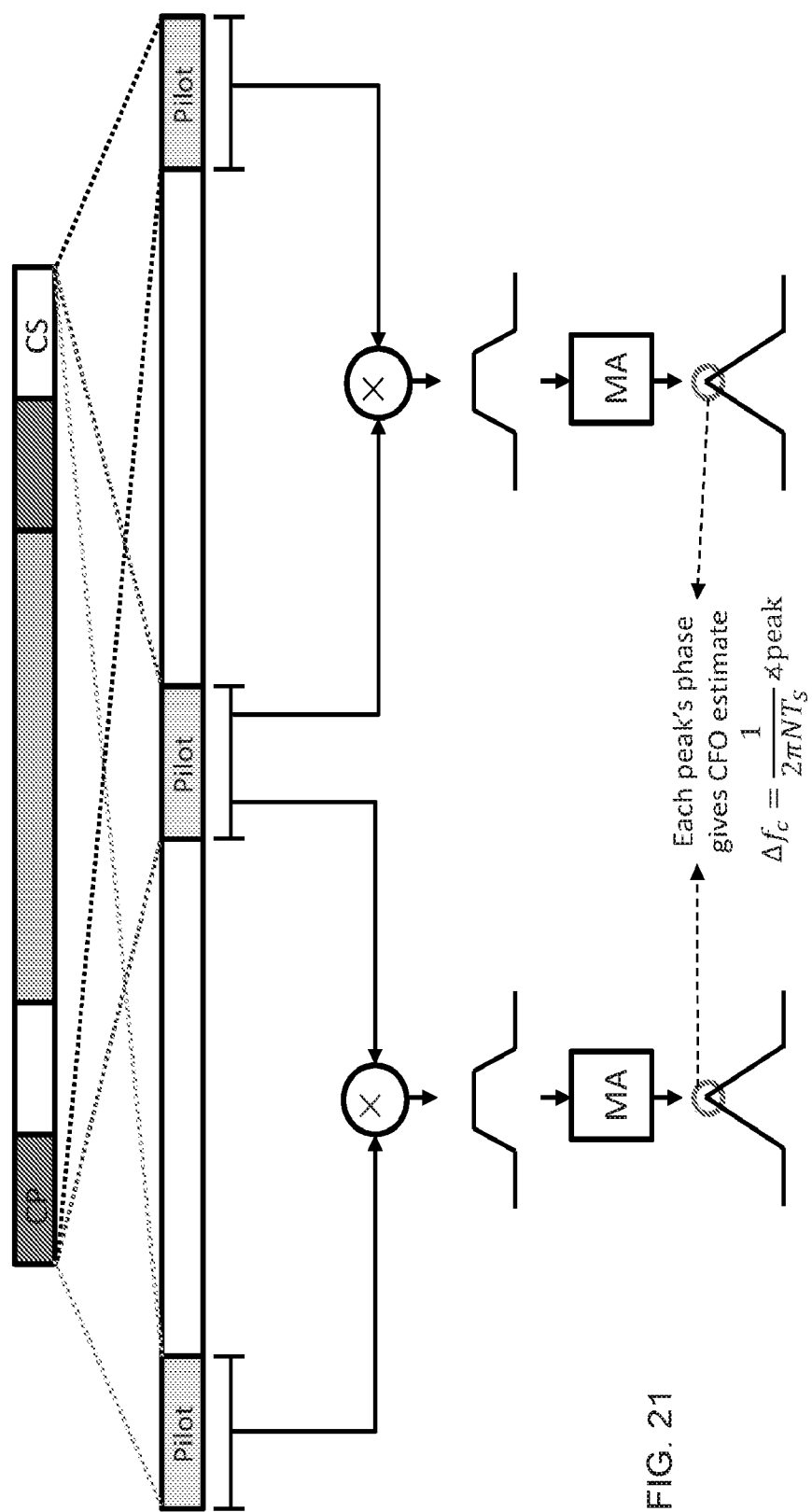
FIG. 21 shows similar waveforms as in FIG. 11, for the case of CP/CS correlations and corresponding moving average filtering.

FIG. 21 illustrates how single peaks can be achieved (independent of the underlying channel) for CP/CS correlator with MA filtering. In the figure, each peak's phase gives CFO estimate as $$\Delta f_c = \frac{1}{2\pi NT_S} \Delta \text{peak} \quad \text{Eq. (10)}$$

In some embodiments, $\Delta f_c$ from multiple peaks may be averaged to get a better coarse CFO estimate. Further, $\Delta f_c$ computed from different receive chains can be averaged for better noise immunity. This carrier frequency error estimate can appropriately be scaled to obtain and correct the coarse VCO error.

Coarse Frame Boundary Detection

Figure 22:
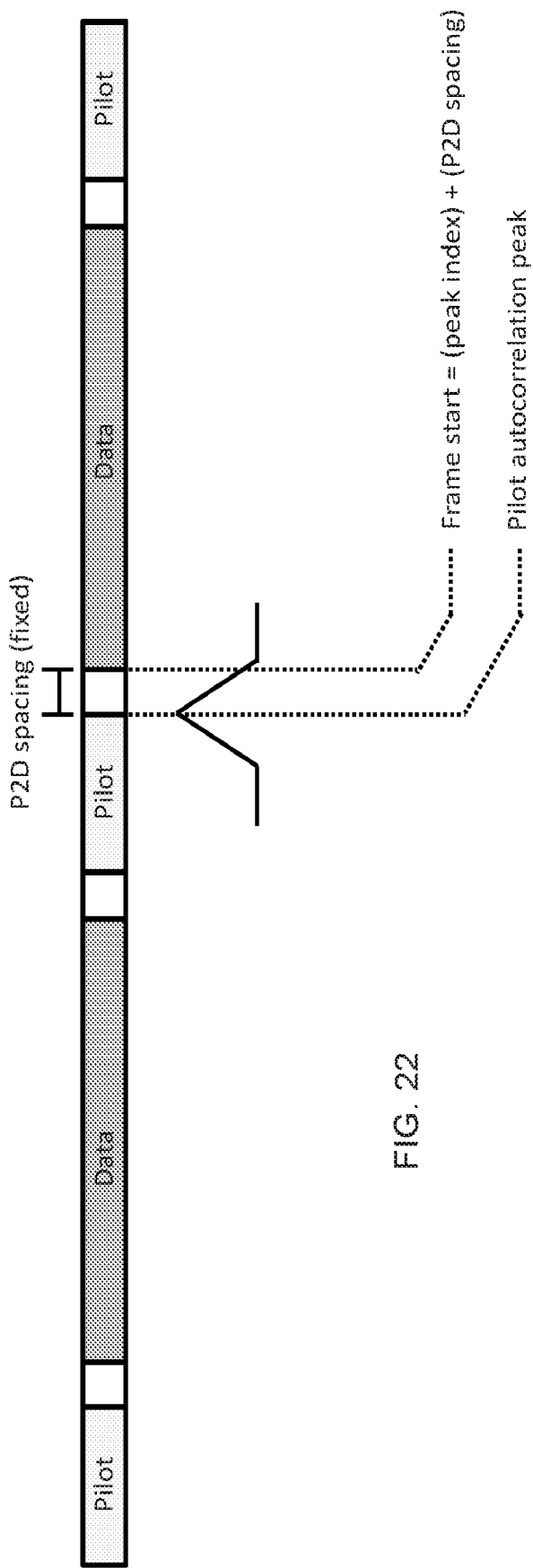
FIG. 22 shows the relative positions of correlation peak, boundaries of pilot frame and data frame for the example relation described for some disclosed embodiments.

FIG. 22 shows an example scheme for coarse frame boundary detection using pilot autocorrelation peak. The scheme may be used to identify the beginning of Pilot frame and an OTFS data frame for subsequent processing (e.g., channel estimation, equalization, and data demodulation). The locations of the pilot correlation peaks indicate the beginning of pilot frames, with a constant, deterministic offset. In the drawing, the pilot to data (P2D) offset is shown to be a fixed number. Therefore, a coarse estimate of the frame start may be based on correlation peak detection by adding the value of P2D spacing, which is known a priori to the receiver.

Correlation peaks, in general, may not be a very accurate metric. Frame boundary detection based on this technic may still be coarse. The boundary detected can be off by a few samples. This may not be a critical issue because the existence of CP protects against data loss.

Fine Frame Boundary Detection

Figure 23:
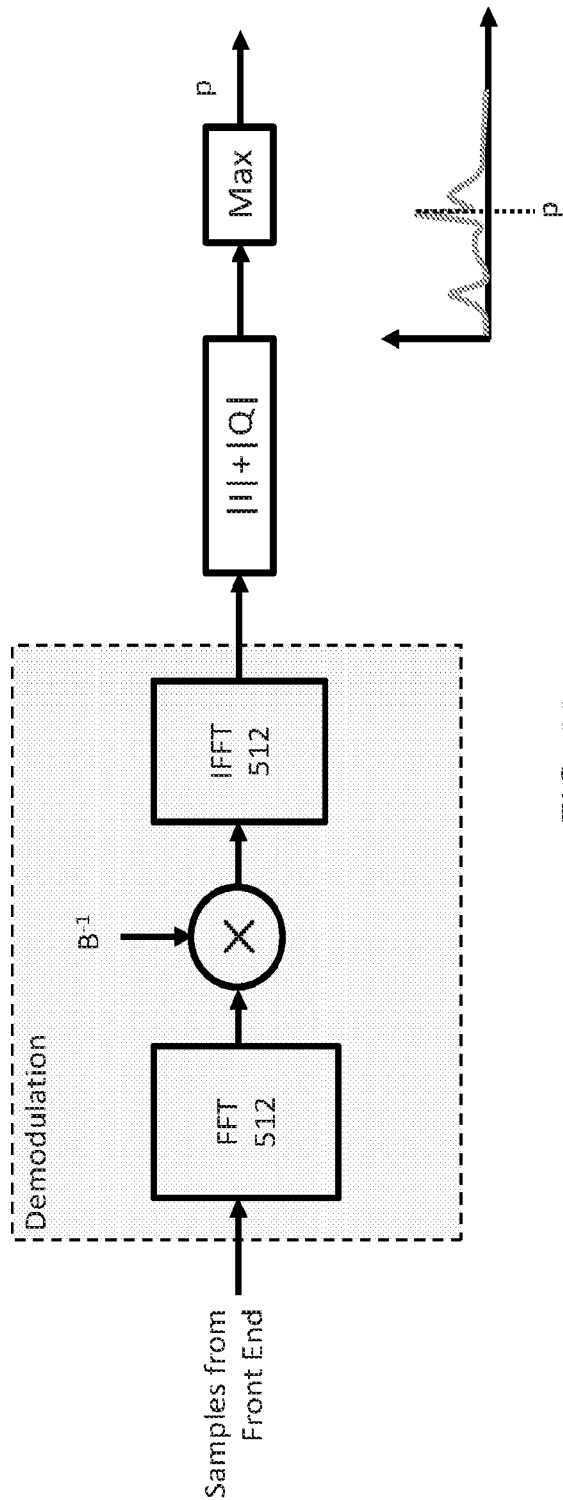
FIG. 23 an example scheme for fine frame boundary detection using demodulated channel response (e.g., Step 6 in FIG. 6).

FIG. 23 shows an example scheme for fine frame boundary detection using demodulated channel response. As previously described, correlation peaks positions are not a very accurate metric for frame boundary detection. To overcome this issue, in some embodiments, the frame start may be finely aligned so as to coincide with the peak of the channel impulse response. Demodulation of pilot frame (that was coarsely located using correlation peak position technique described earlier) and finding the maximum value of the impulse response magnitude are shown in FIG. 23. In some embodiments, resynchronization may be performed when tracked value becomes significantly different from the original value.

Fractional Offset Delay Estimation and Correction

In general, channel impulse response can be such that the peak of the impulse response does not coincide with a sample boundary. To align the peak with a sample boundary, a fractional offset adjustment of the received samples should be performed. Once the phase offset it detected, the correction can be implemented with an appropriately sampled poly-phase filter. There are two mechanisms to determine this phase offset error.

One mechanism may be to use interpolation of the channel using sinc function and determining the peak and thus the fractional offset. The other mechanism is to perform band edge timing recovery (e.g., see FIG. 24). It may be possible that even if this correction is not applied, the MISE feed forward equalizer will correct for this discrepancy. The absence of a fractional offset correction may result in higher impulse response tail which will entail the use of a longer cyclic prefix.

STO Error Estimation and STO Correction

Figure 35:
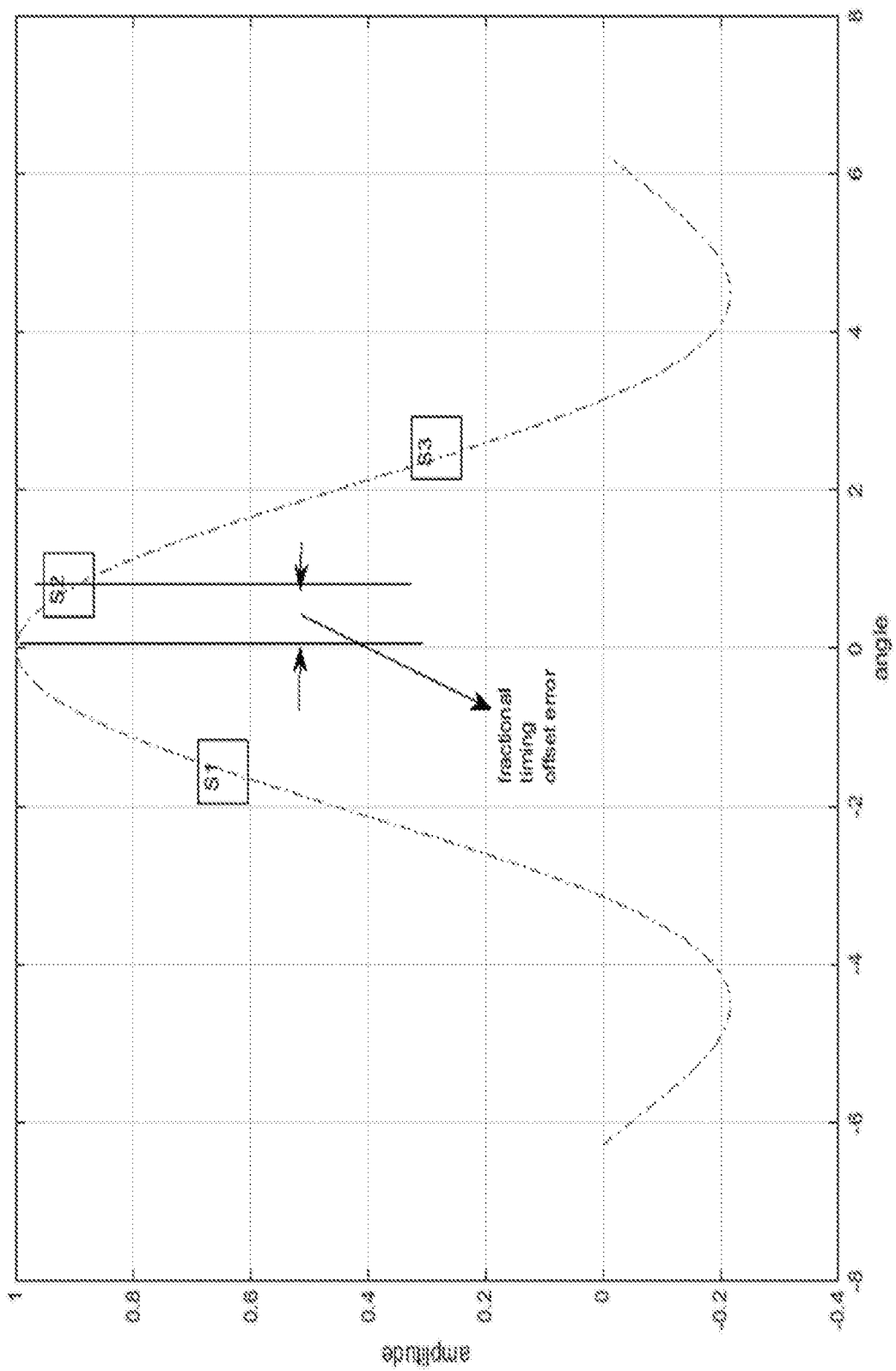
FIG. 35 is an illustration of an example of fractional timing offset error estimation.

FIG. 35 illustrates the principle of fractional timing offset error estimation using sync interpolation. After the pilots are demodulated, let S2 be the output of the peak pilot amplitude. Let the samples that are adjacent to S2 be S1 and S3 as shown in FIG. 35. A magnitude interpolation could provide an estimate of the fractional timing estimate error as shown in the figure. Note that normalizing S1 and S3 with magnitude of S1 can make the interpolation more accurate and easy to implement. In some embodiments, the normalizations and amplitude calculations can be performed using cordic algorithm.

Figure 24:
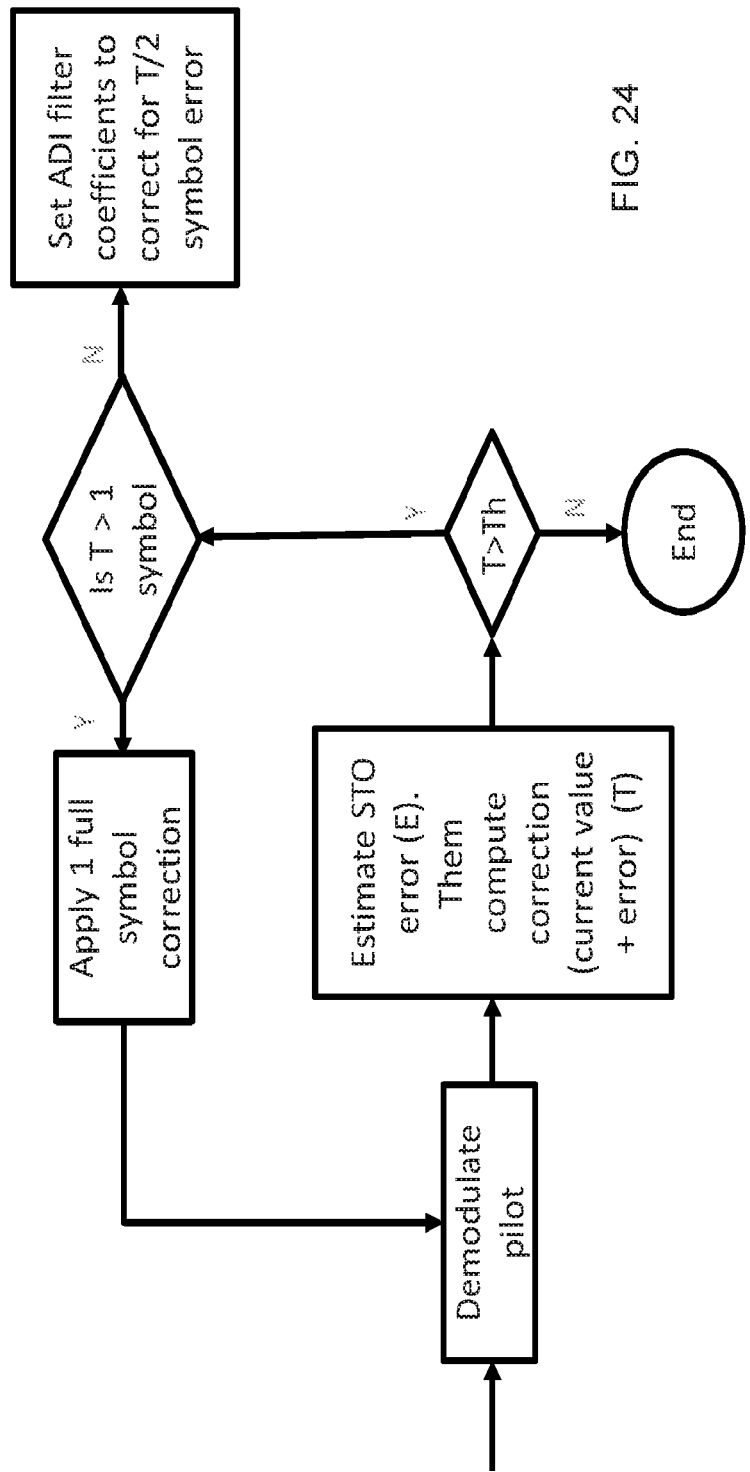
FIG. 24 shows an exemplary flowchart for correcting the symbol timing offset (e.g., Step 7 in FIG. 6).

FIG. 24 shows a flowchart for symbol timing offset correction. Once the symbol timing offset error is detected from the demodulated pilots, the corrected value can be computed as below: First, add the error to the current offset value and check if the computed offset is above a set threshold. If the computed offset value is above the threshold, further check if the offset is bigger than sample spacing. If the computed offset is more than the sample spacing, the final fractional offset to be applied is obtained through a modulo operation (e.g., subtract off one sample offset value). The number of integer samples, in this case, may be corrected separately.

Figure 25:
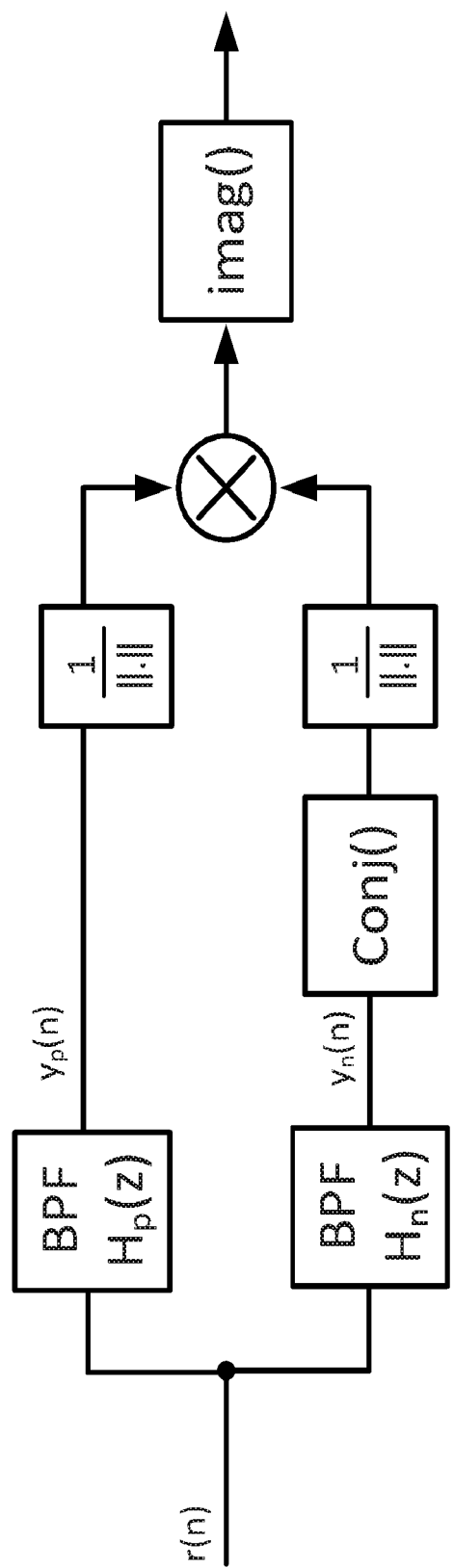
FIG. 25 shows an example scheme for band-edge timing recovery.

FIG. 25 shows an example scheme for band-edge timing recovery. In this scheme, normalized, band-pass filtered received baseband waveform is correlated to get an estimate of the timing phase. The STO estimator is applied only during the receive data frames (e.g., not during zero-energy guard or transmit intervals).

Figure 26:
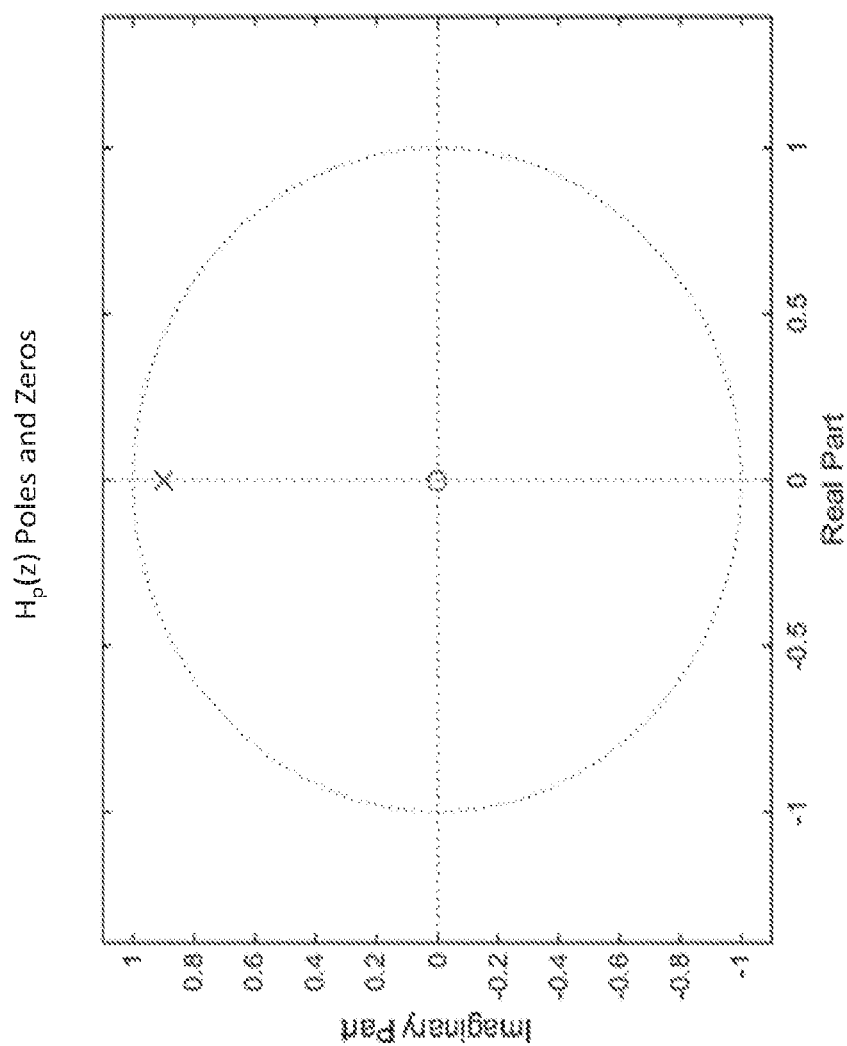
FIG. 26 shows examples of band-pass filter design and the filter response.
Figure 26:
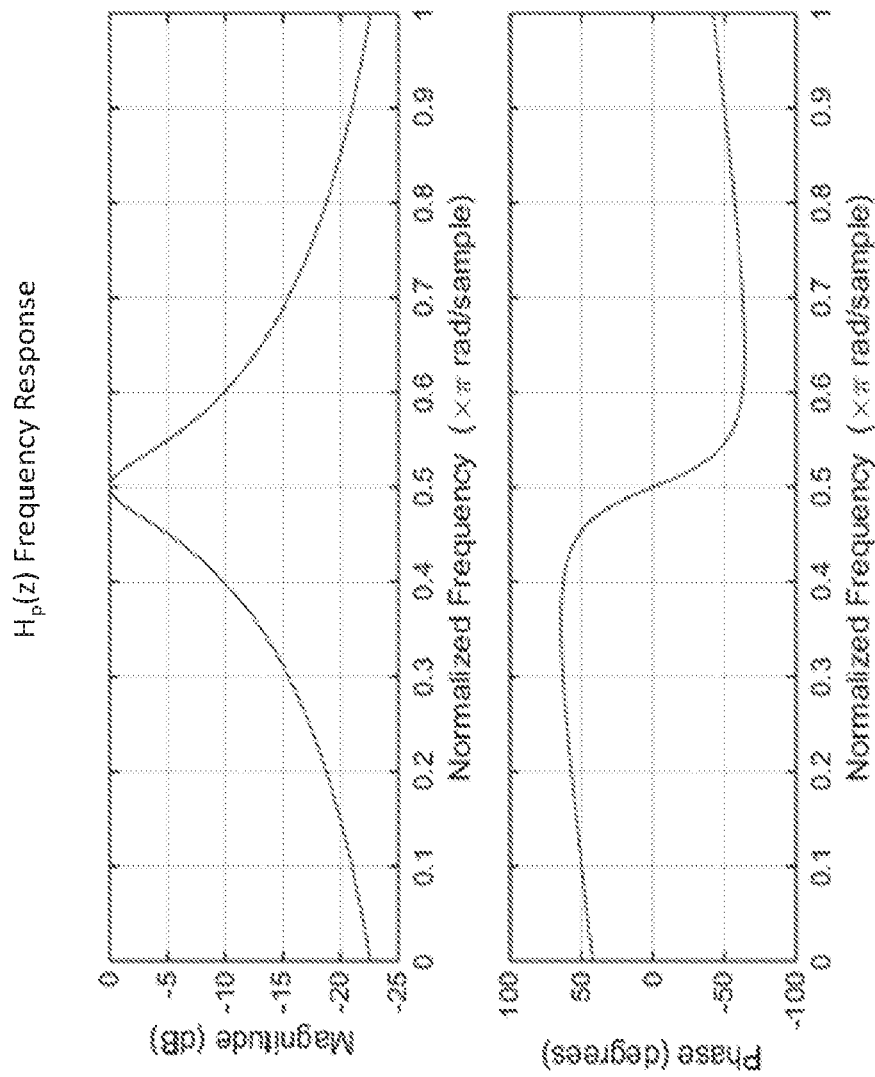

FIG. 26 shows examples of band-pass filters that may be used in the scheme described in FIG. 25. These bandpass filters may have the following transfer functions. Note that 0<b<1. The frequency responses of these filters are given in the same figure.

$$H_p(z) = \frac{b}{1 + (1-b)e^{\frac{j*\pi}{2}} z^{-1}} \quad \text{Eq. (11)}$$

Similarly $$H_n(z) = \frac{b}{1+(1-b)e^{\frac{-j*\pi}{2}}z^{-1}}$$ Eq. (12)

PLL Tracking

In some examples, the angle between I and Q of the auto-correlation peaks is proportional to the carrier frequency error (if the frequency error is less than ½ the rate of pilot occurrence). In some examples, after the coarse frequency correction, the residual frequency error is much less than this. Driving a $2^{nd}$ order PLL using this error signal helps to track the carrier frequency. PLL error sampling frequency (the rate of pilot occurrence) is the inverse of pilot Frame Spacing. This is generally, very small compared to the sampling rate of the incoming data. This constrains the bandwidth of the PLL to be generally narrow. Additionally the correction has to be applied at the VCO level (at a much lower frequency than the carrier frequency). This reduces the applicable BW further. This causes the PLL to convergence slowly. As a result, the instantaneous frequency deviations due to Doppler cannot be effectively tracked.

A mathematical model for the auto-correlation of the received pilot signal may be developed as follows:

Denote pilot signals by p. Let channel have N taps with delay, Doppler and attenuation $\tau_i$, $\nu_i$, $\alpha_i$. Let the time between pilot columns be denoted as T Pilot received at kT may be represented as:

$$\sum_{n=1}^{N} a_n \exp(2\pi i \nu_n kT) \exp(2\pi i \nu_n (t-\tau_n)) p(t-\tau_n)$$ Eq. (13)

Similarly, pilot received at (k+1)T may be represented as:

$$\sum_{n=1}^{N} a_n \exp(2\pi i \nu_n (k+1)T) \exp(2\pi i \nu_n (t-\tau_n)) p(t-\tau_n)$$ Eq. (14)

Correlating signals at kT and (k+1)T is obtained by taking the inner product of the above 2 terms. Mathematically, $$corr_{n,m} = \langle \exp(2\pi i \nu_n (t-\tau_n)) p(t-\tau_n), \exp(2\pi i \nu_m (t-\tau_m)) p(t-\tau_m) \rangle$$

The above operation will result in 2 terms as below. The first term is a sinusoid that has oscillation frequency equal to the Doppler frequency. The amplitude of this term is a function of the channel magnitude (an). When the system is not carrier locked, the Doppler frequency will encompass the carrier frequency offset as well. However, when the carrier frequency offset is nil, this term will represent the Doppler frequency offset between the transmitter and receiver. The $2^{nd}$ term is proportional to the Doppler frequency beats. Usually these beat frequencies will be quite low compared to the Doppler frequency in the system.

$$\sum_{n=1}^{N} |a_n|^2 \exp(2\pi i \nu_n T) +$$ Eq. (15)

$$2 \sum_{n=1}^{N} \sum_{m=n+1}^{N} \text{real}(a_n \bar{a}_m) \cos(2\pi (\nu_n - \nu_m) kT) corr_{n,m}$$

The beats (the second term in Eq. 15), may be removed using a low pass filter. This low-passed filtered error signal is sent to the PLL for tracking. In order to obtain a constant amplitude error signal, it is recommended to obtain the phase of the peaks of this signal and compute the equivalent frequency error and use it to drive the PLL.

PLL Tracking Using Pilot Autocorrelation Peaks

Figure 27:
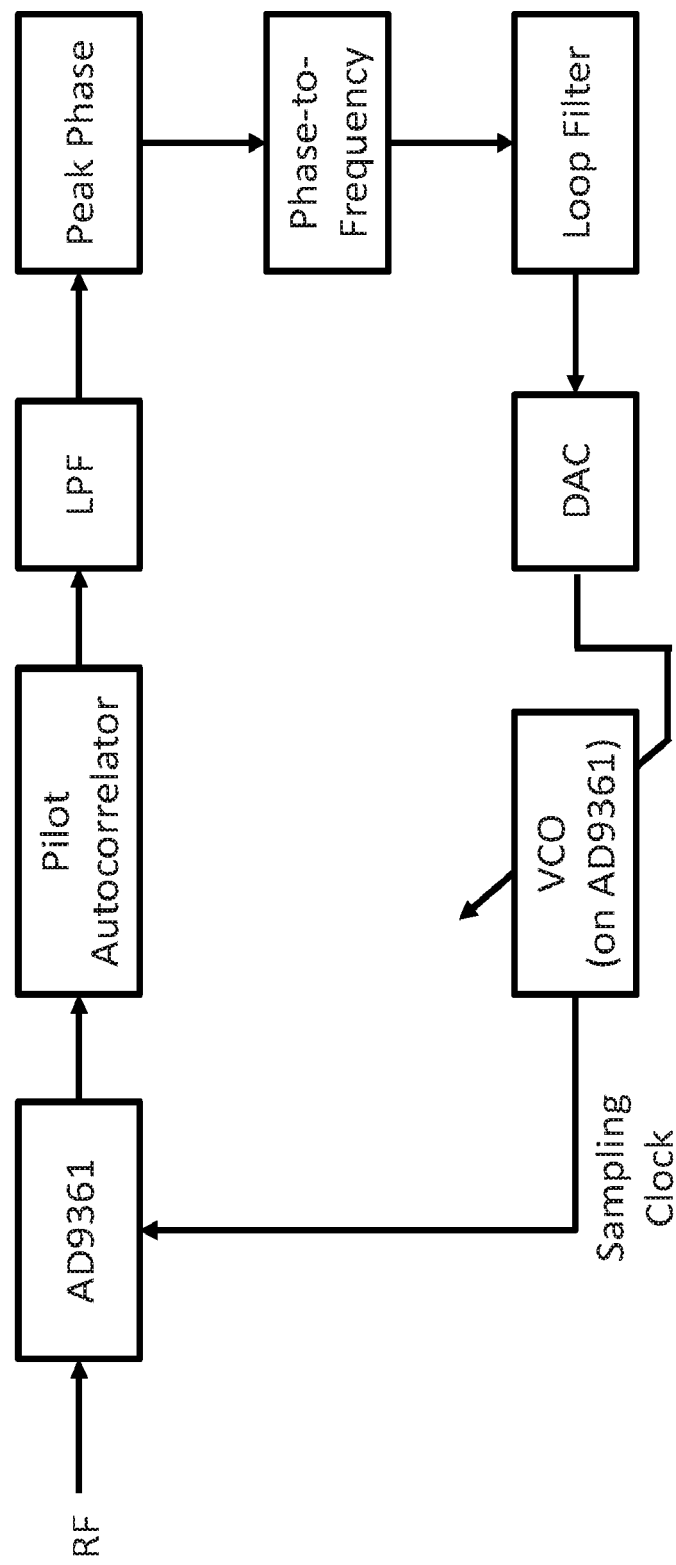
FIG. 27 shows an example scheme for phase-locked loop tracking using pilot autocorrelation peaks.

FIG. 27 shows an example scheme for phase-locked loop tracking using autocorrelation peaks. The RF input is sampled using a sample clock. Pilot autocorrelation is performed on digitized signal. The output of autocorrelator is filtered through a low pass filter. This is followed by a peak phase detection circuit. The detected phase peaks are converted into frequency values using a phase to frequency conversion and the result is fed back through a loop filter and a digital to analog conversion circuit to adjust the sampling clock generated by a voltage controlled oscillator (VCO).

AGC Gain Adjustment

Figure 28:
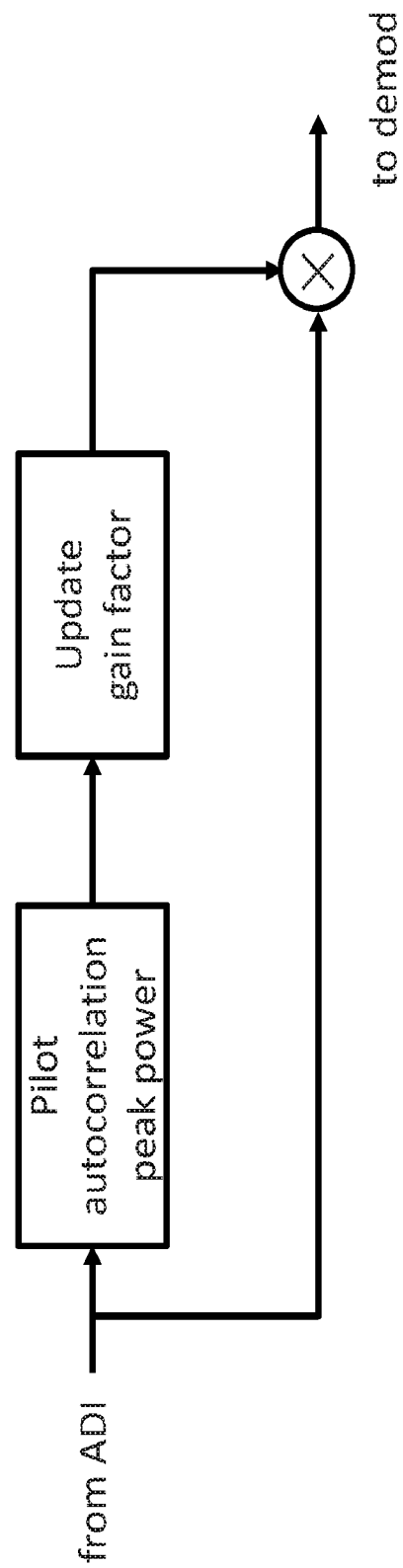
FIG. 28 shows an example of fine gain adjustment using pilot autocorrelation peak power.

FIG. 28 shows an example of AGC gain adjustment using pilot autocorrelation peak amplitude and multiplier. As described earlier, an initial gain adjustment is estimated using the ADC clip statistics. The coarse gain adjustment is estimated by measuring the pilot auto-correlation peak amplitude. This estimation, as was disclosed earlier, will be coarse as the auto-correlation peak amplitude can be varying significantly due to the high initial carrier frequency offset that may exist. Once the carrier PLL is in the tracking mode, pilot auto-correlation peaks will be relatively stable and their amplitude can be used for estimating the AGC fine gain. It has been found that values estimated thus by averaging a few peak amplitudes, could be as close as 0.25 dB or better with the true power.

Figure 29A:
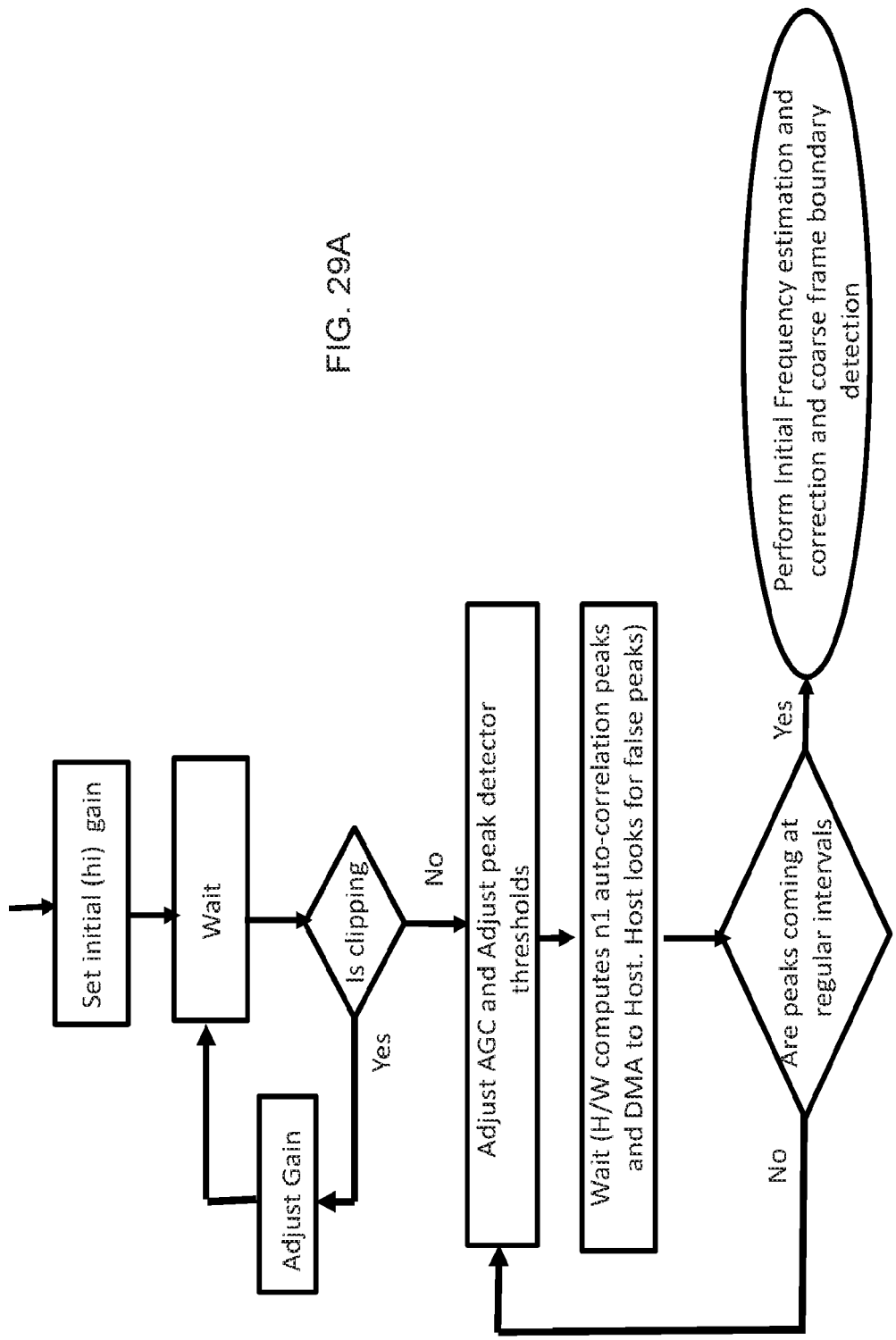
FIGS. 29A, 29B and 29C show flowcharts for different portions of an exemplary implementation for AGC and synchronization.
Figure 29B:
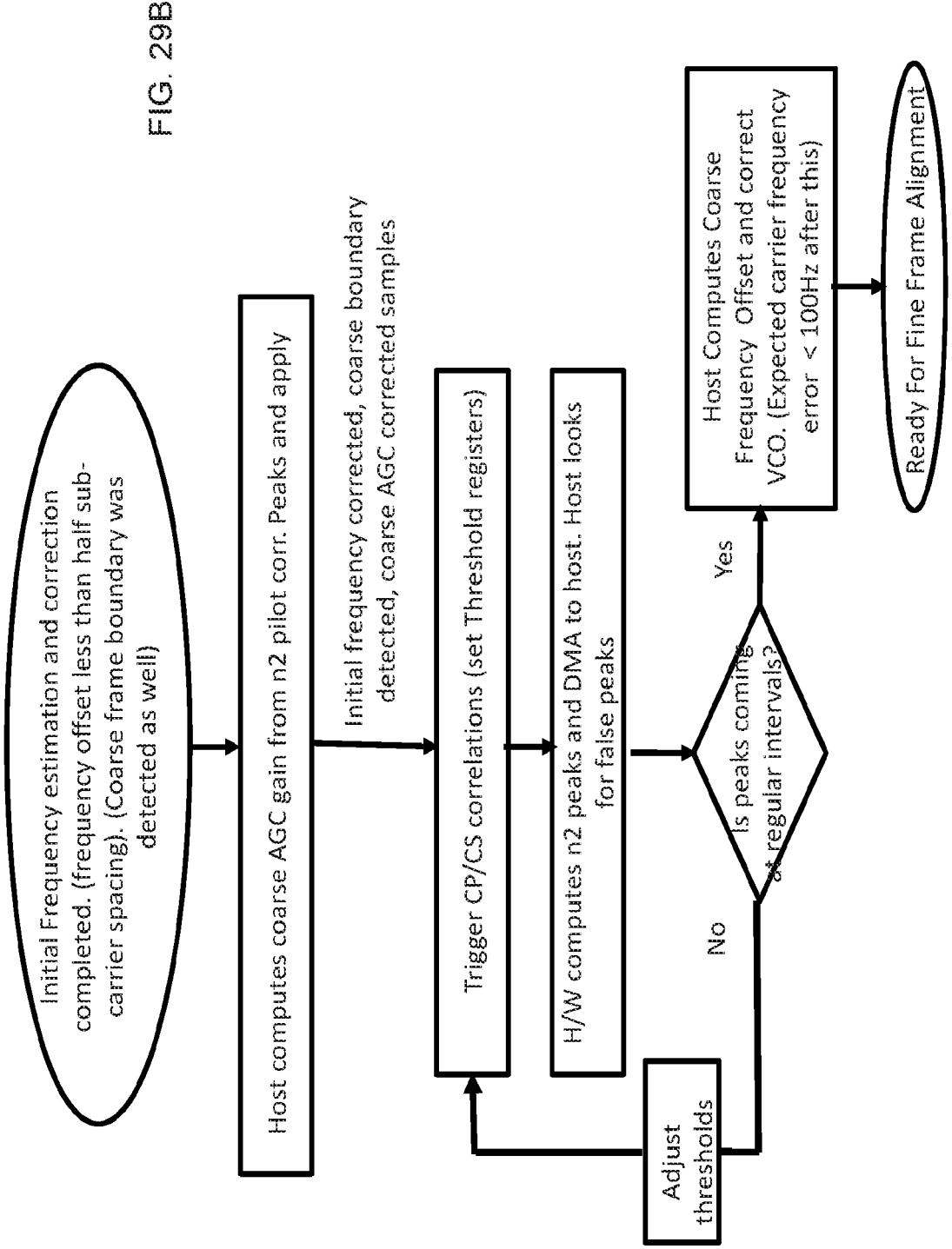
Figure 29C:
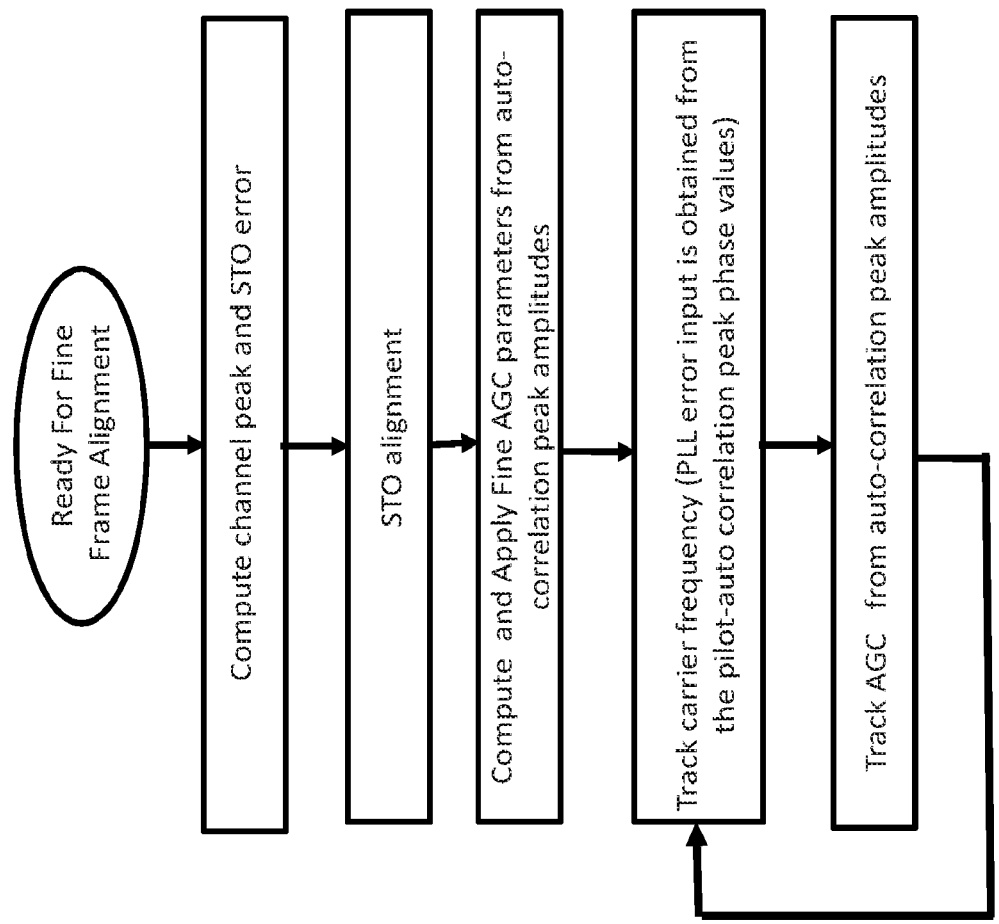

FIG. 29A, FIG. 29B and FIG. 29C show different portions of a flowchart for an example implementation of AGC and synchronization in an example OTFS receiver. All various steps in this flow diagram have been explained in the document.

The process depicted in FIG. 29A is as follows. Initially, gain is set at a certain value. Then, clipping of the signal is monitored. The gain is adjusted downwards if clipping is observed. Next, if signal is not being clipped, then the AGC and peak detector thresholds are adjusted. Then, n1 number of autocorrelation peaks may be calculated (n1 is an integer and may be programmable). In some embodiments, the peak calculation may be performed by a hardware circuit. Next, a determination may be made about whether peaks exhibit a regular interval. If not, then the AGC and peak detector thresholds are re-adjusted. If the autocorrelation peaks are occurring at regular intervals, then initial frequency estimation and correction and coarse frame boundary detection are performed.

As depicted in FIG. 29B, after the initial frequency estimation and correction is completed, then a coarse AGC gain may be computed using n2 number of pilot correlation peaks. Here, n2 is an integer and may be programmable. After AGC correction, the CP/CS correlation computation may be performed. Then n2 autocorrelation peaks are calculated. This process is iteratively repeated until it is determined that the correlation peaks are occurring at a regular interval. Next, a coarse frequency offset and a VCO correction may be performed.

As depicted in FIG. 29C, after the method of FIG. 29B is performed, fine frame alignment may be performed by computing channel peak and STO error, followed by alignment of STO, computing and applying fine AGC parameters from autocorrelation peak amplitudes. Next, carrier frequency and AGC may be iteratively tracked to maintain accuracy during the operation.

Example of Auto Correlator Hardware Implementation

Figure 30:
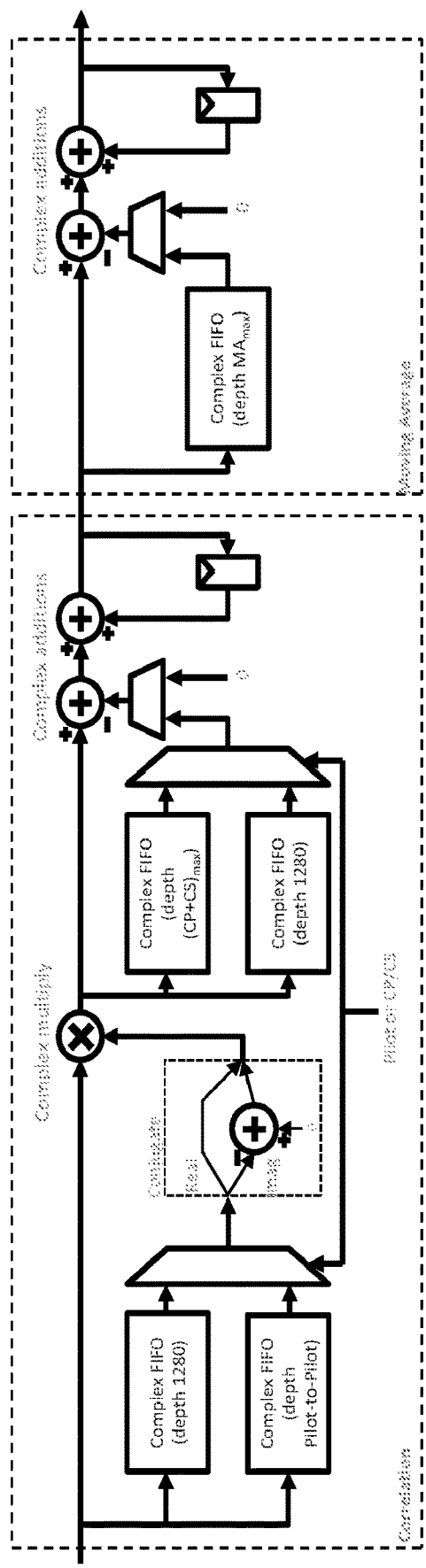
FIG. 30 shows an example implementation of a correlator in hardware for the Pilot and CP/CS portions of a frame.

FIG. 30 shows an example hardware implementation of a correlator that is used embodiments of the disclosed technology. Note that by changing different parameters in this correlator, it can be used both for pilot auto-correlation and CP/CS auto-correlation.

Peak Detection State Machine

Figure 31:
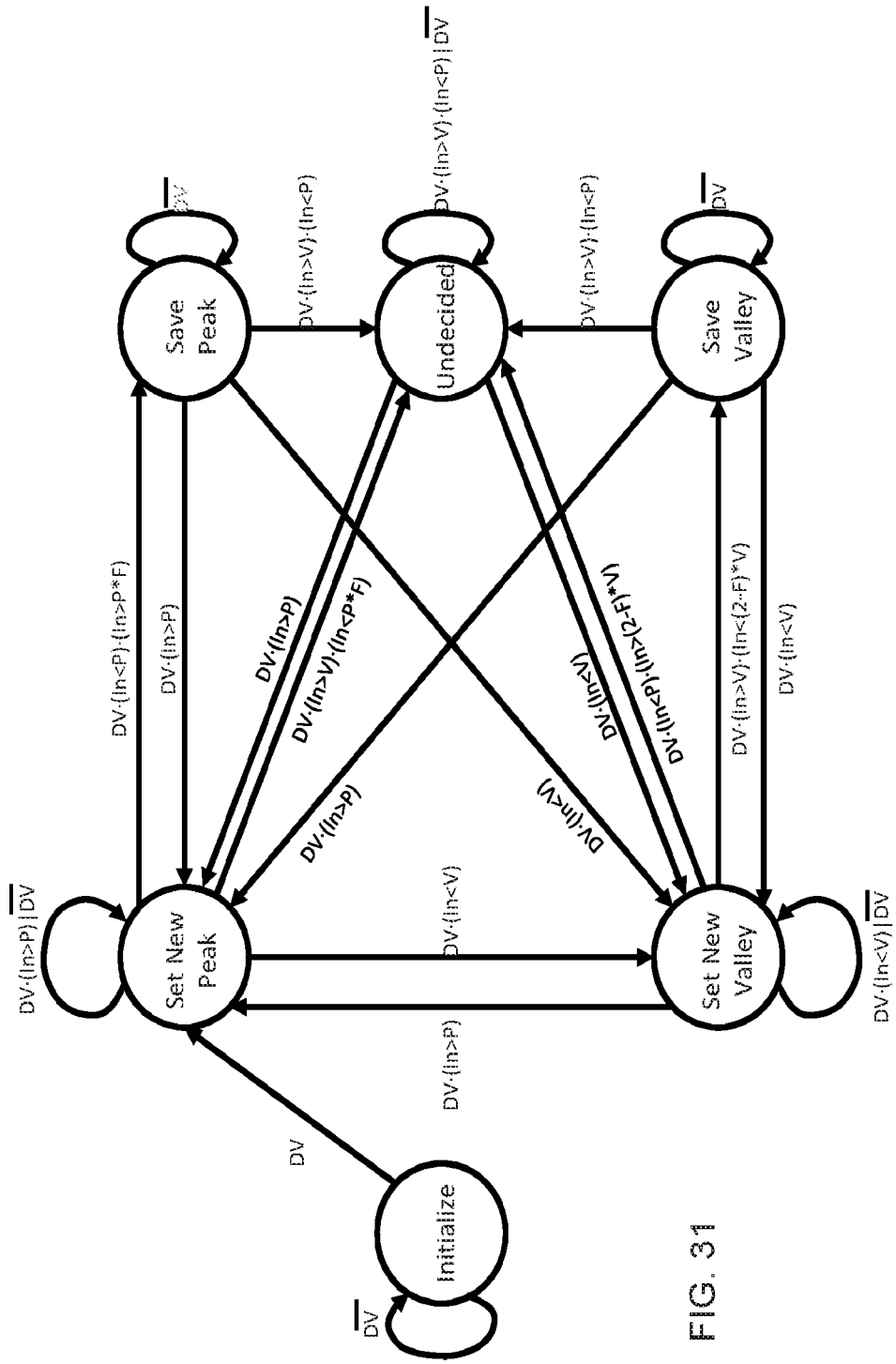
FIG. 31 shows an example state machine implementation of a peak detector.

FIG. 31 shows an example state machine implementation of a peak detector described in FIG. 16. Here DV stands for Data Valid. In is the input sample amplitude. P stands for present peak amplitude, F is a scale factor, and V is the present valley amplitude.

Figure 32:
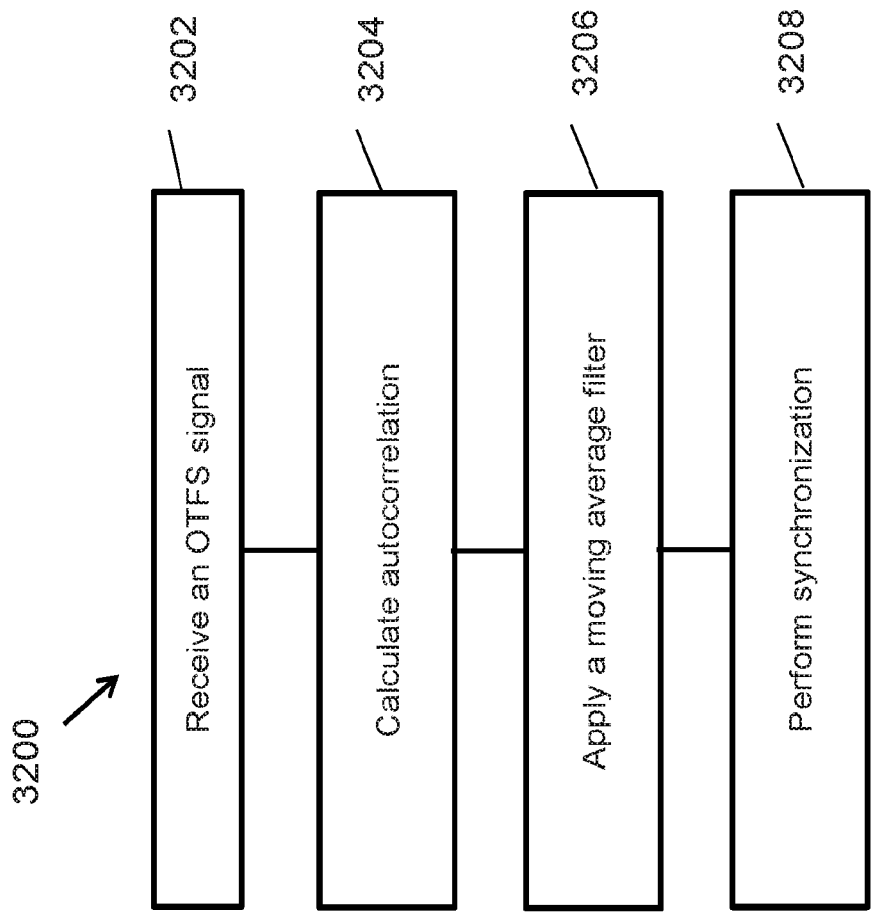
FIG. 32 is a flowchart of an example of a wireless signal reception method.

FIG. 32 is a flowchart for an example method 3200 of receiving wireless signals. The method 3200 includes receiving (3202) an orthogonal time frequency space (OTFS) modulated wireless signal comprising data transmissions interspersed with pilot signal transmissions. For example, for OTFS signals that are defined in the delay-Doppler domain, the pilot signal transmissions and data transmissions may be multiplexed with each other along the delay and/or Doppler dimensions. When converted into a time-frequency domain signal and transmitted, the data and pilot transmissions may appear to be overlapping, but may be separable using the delay-doppler domain representation.

In some embodiments, the method 3200 includes calculating (3204) autocorrelation of the wireless signal using the wireless signal and a delayed version of the wireless signal that is delayed by a pre-determined delay, thereby generating an autocorrelation output. For example, the autocorrelation may be calculated by using a number of values of the pre-determined delay to obtain a functional relationship between amount of autocorrelation as a function of the delay. The method 3200 further includes processing (3206) the autocorrelation filter by applying a moving average filter to produce a fine timing signal. For example, the timing signal may be used to produce a clean autocorrelation peak signal independent of the channel response (for example, as discussed with respect to FIG. 35) and using this performing (3208) synchronization with the wireless signal using the fine timing signal. During synchronization achieved in 3208, coarse AGC and fine AGC may also be performed. For example, some techniques are described with respect to FIG. 6, FIG. 18, FIG. 29A and FIG. 29B.

In some implementations, the method 3200 further includes identifying frame boundaries for data transmissions based on the autocorrelation output. For example, FIG. 11 and FIGS. 12-16 depict and describe moving average based techniques. In some implementations, gain adjustment and tracking may also be performed by determining magnitudes of correlation peaks. For example, FIGS. 18 to 23 and corresponding descriptions provide some implementation examples. For example, as depicted in FIG. 20, in some embodiments, the moving average filter operates over a number of samples equal to sum of lengths of cyclic prefix and cyclic suffix field. The values of the length of CP and CS may be known to the receiver without using signal processing. For example, these values may have been signaled in a message by the transmitter or may be pre-specified by interoperability standard.

In some embodiments, the method 3200 may further include determining magnitudes of autocorrelation peaks. This determination may be performed using a curve representative of the magnitude of autocorrelation as a function of time delay. For example, FIGS. 14-16 and the corresponding description provide some examples of how this technique may be implemented. In some examples, an exponential weighting may be used for improving robustness of the calculation. For example, Eq. (5a) and the corresponding description show one example formula that may be used for the calculation.

In some implementations, frame boundaries may be identified using a linear fit operation in which a linear approximation on the autocorrelation output. For example, FIG. 6 and the corresponding description provides some example implementations of how a linear approximation is determined for the calculations.

Figure 33:
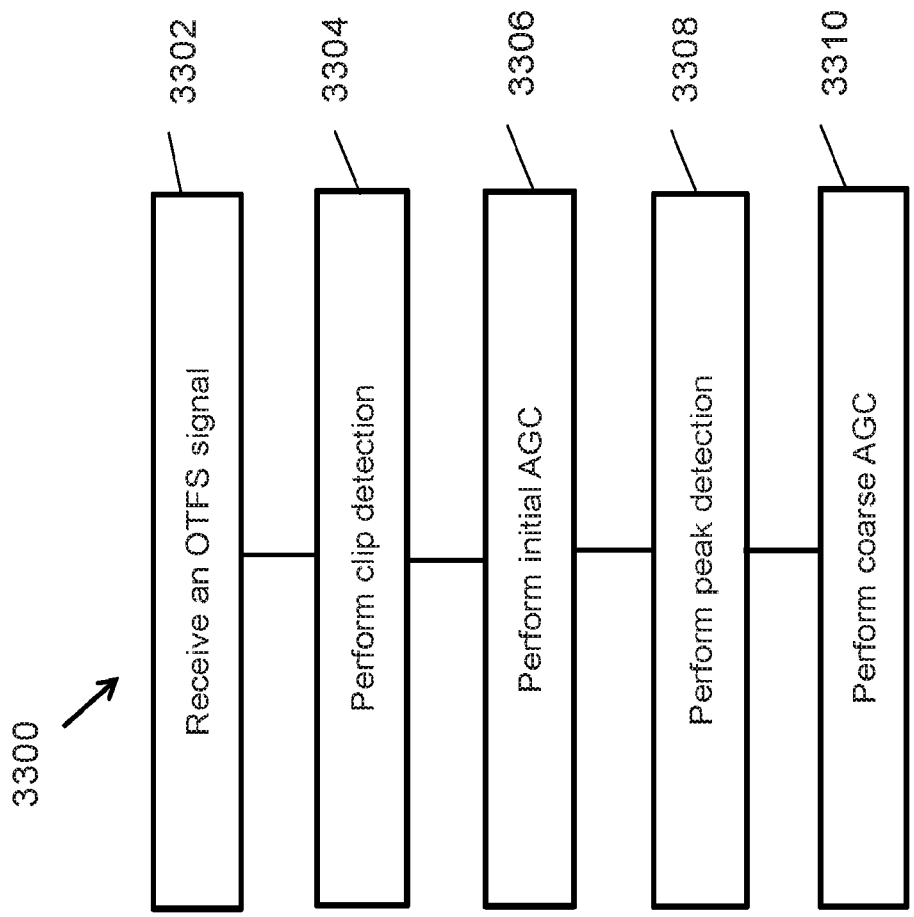
FIG. 33 is a flowchart of an example of a wireless signal reception method.

FIG. 33 shows a flowchart for an example method 3300 for receiving an OTFS signals and performing automatic gain control thereof. The method 3300 may be performed at a receiver of OTFS signal. Using the method 3300, the receiver may successfully receive information bits that are modulated on the OTFS signal and recover the information bits after the steps described with respect to the method 3300. As previously discussed with respect to method 3200, the OTFS signal may include data transmissions interspersed with pilot signal transmissions.

The method 3300 includes receiving an OTFS modulated signal (3302), performing initial AGC correction (3306; e.g., Step 1 of FIG. 6) using clip statistics gathered from ADC (3304), followed by a coarse AGC correction (3310; e.g., Step 2 of FIG. 6).

In some embodiments, the method 3300 may further include determining magnitudes of autocorrelation peaks, and performing a gain adjustment based on the determined magnitudes of autocorrelation peaks. As described with respect to method 3200 and in the present document, an exponential windowing function may be used for the calculation of the autocorrelation peaks. In some embodiments, magnitudes of the autocorrelation peaks may be used to determine a symbol timing offset value for symbols in the OTFS modulated wireless signal.

In some implementations of method 3200 or 3300, an estimate of the carrier frequency in the OTFS signal that is received may be obtained and tracked using a phase-locked loop using the autocorrelation output. Some example embodiments are discussed with reference to FIG. 6, FIG. 7, FIGS. 29A and 29B.

In some embodiments, another phase-locked loop may be used to track values of the gain adjustment that is used during the method 3300 to recover or extract information bits from the OTFS signal. The symbol timing offset value is calculated based on interpolating channel amplitude estimates or by performing band-edge timing recovery. Example embodiments are described with reference to FIG. 24 and FIG. 25.

Figure 34:
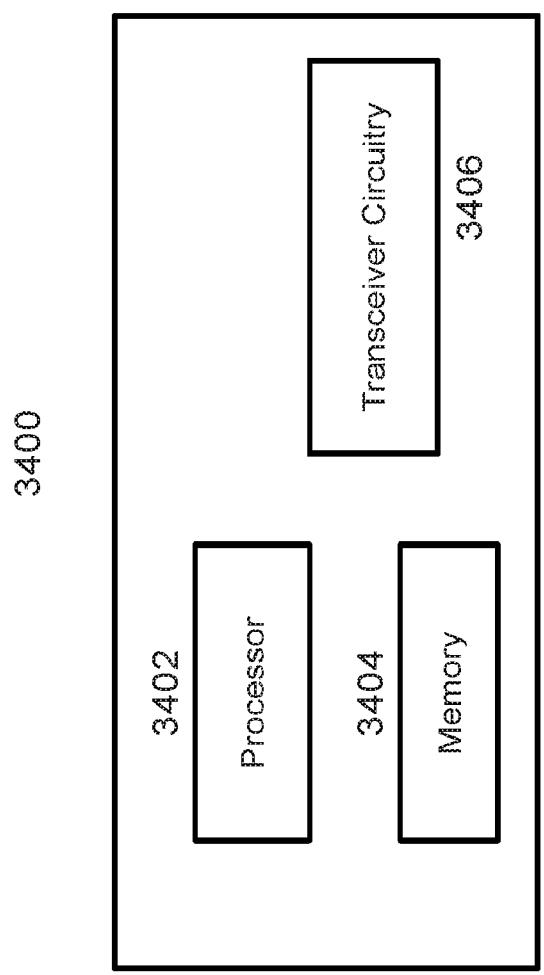
FIG. 34 shows an example of a wireless transceiver apparatus.

FIG. 34 shows an example of a wireless transceiver apparatus 3400. The apparatus 3400 includes a processor 3402 that may be configured to read instructions from a memory 3404 and implements techniques described in the present document. The apparatus 3400 also includes transceiver circuitry 3406 that is used for receiving and processing wireless signals, and may also be used for transmitting wireless signals. The apparatus 3400 may implement the various signal reception and synchronization techniques described herein. For example, the OTFS signals may be received by the transceiver circuitry 3406 which may also implement various operations such as PLL, AGC, and so on.

It will be appreciated that techniques for achieving accurate synchronization in OTFS receiver are disclosed. In one advantageous aspect, the disclosed techniques are robust to Doppler shifts in the received signals. In another advantageous aspect, successively finer synchronization and AGC is achieved using auto-correlation followed by a moving average.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general (for e.g., T2080) and special purpose microprocessors (for e.g., MicroBlaze or ARC), and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A signal reception method, comprising:
receiving an orthogonal time frequency space (OTFS) modulated wireless signal comprising pilot signal transmissions interspersed with data transmissions;
calculating an autocorrelation of the wireless signal using the wireless signal and a delayed version of the wireless signal that is delayed by a pre-determined delay, thereby generating an autocorrelation output, wherein the pre-determined delay is equal to a time spacing between successive pilot signal transmissions;
processing the autocorrelation output through a moving average filter to produce a fine timing signal; and
performing synchronization with the wireless signal using the fine timing signal.

2. The method of claim 1, further including:
identifying frame boundaries for data transmissions based on the autocorrelation output.

3. The method of claim 1, wherein the moving average filter operates over a number of samples equal to sum of lengths of cyclic prefix and cyclic suffix field.

4. The method of claim 1, further including:
determining magnitudes of autocorrelation peaks, and performing gain adjustment based on the magnitudes of the autocorrelation peaks.

5. The method of claim 4, wherein the autocorrelation peaks are determined using an exponential windowing function.

6. The method of claim 2, wherein the identifying operation includes performing a linear fit operation on the autocorrelation output.

7. The method of claim 1, wherein the method further includes, during the performing synchronization, determining a symbol timing offset value for symbols in the OTFS modulated wireless signal.

8. A wireless communication device comprising a processor and transceiver circuitry wherein the transceiver circuitry is configured for:
receiving an orthogonal time frequency space (OTFS) modulated wireless signal comprising pilot signal transmissions interspersed with data transmissions; and
wherein the processor is configured for:
calculating autocorrelation of the wireless signal using the wireless signal and a delayed version of the wireless signal that is delayed by a pre-determined delay, thereby generating an autocorrelation output, wherein the pre-determined delay is equal to time spacing between successive pilot signal transmissions;
processing the autocorrelation output through a moving average filter to produce a fine timing signal; and
performing synchronization with the wireless signal using the fine timing signal.

9. The wireless communication device of claim 8, wherein the processor is further configured for:
identifying frame boundaries for data transmissions based on the autocorrelation output.

10. The wireless communication device of claim 8, wherein the moving average filter operates over a number of samples equal to sum of lengths of cyclic prefix and cyclic suffix field.

11. The wireless communication device of claim 8, wherein the processor is further configured for:
determining magnitudes of autocorrelation peaks, and
performing gain adjustment based on the magnitudes of the autocorrelation peaks.

12. The wireless communication device of claim 11, wherein the autocorrelation peaks are determined using an exponential windowing function.

13. The wireless communication device of claim 9, wherein the identifying operation includes performing a linear fit operation on the autocorrelation output.

14. The wireless communication device of claim 8, wherein the processor is further configured to determine, during the performing synchronization, a symbol timing offset value for symbols in the OTFS modulated wireless signal.

15. The wireless communication device of claim 8, wherein the processor is further configured for:
detecting at least one autocorrelation peak in the fine timing signal,
wherein the samples corresponding to the at least one autocorrelation peak comprise a first number consecutive samples with a positive slope followed by a second number of consecutive samples with a negative slope, and
wherein a magnitude of each of the samples is above a noise floor.

* * * * *